US012782657B2

(12) United States Patent
Yanagisawa

(10) Patent No.: US 12,782,657 B2
(45) Date of Patent: Nov. 3, 2026

(54) OPTICAL MODULE

(71) Applicant: Shinko Electric Industries Co., LTD., Nagano-ken (JP)

(72) Inventor: Kenji Yanagisawa, Nagano (JP)

(73) Assignee: Shinko Electric Industries Co., LTD., Nagano (JP)

( * ) Notice: Subject to any disclaimer, the term of this patent is extended or adjusted under 35 U.S.C. 154(b) by 288 days.

(21) Appl. No.: 18/760,240

(22) Filed: Jul. 1, 2024

(65) Prior Publication Data

US 2025/0012985 A1 Jan. 9, 2025

(30) Foreign Application Priority Data

Jul. 7, 2023 (JP) ................................ 2023-112106

(51) Int. Cl.
*G02B 6/42* (2006.01)

(52) U.S. Cl.
CPC ......... *G02B 6/4243* (2013.01); *G02B 6/4239* (2013.01)

(58) Field of Classification Search
CPC .... G02B 6/423; G02B 6/4239; G02B 6/4243; G02B 6/4244; G02B 6/3636; G02B 6/3652
See application file for complete search history.

(56) References Cited

U.S. PATENT DOCUMENTS 4,768,199 A * 8/1988 Heinen ................ G02B 6/4233 385/91
5,557,695 A * 9/1996 Yamane .................. G02B 6/30 385/83
5,641,612 A * 6/1997 Lee ...................... G02B 6/4232 438/65
6,511,235 B2 * 1/2003 Wu ...................... G02B 6/4214 385/88
7,440,668 B2 * 10/2008 Colgan .................. G02B 6/423 385/89
7,511,258 B2 * 3/2009 Bowen ................... G02B 6/423 385/52
11,650,381 B1 * 5/2023 Polomoff ................ G02B 6/30 385/49

(Continued)

FOREIGN PATENT DOCUMENTS

JP 2015-079061 A 4/2015

*Primary Examiner* — Rhonda S Peace
(74) *Attorney, Agent, or Firm* — Wolf, Greenfield & Sacks, P.C.

(57) ABSTRACT

An optical module includes a first cladding layer formed on a substrate, a first groove extending through the first cladding layer in a thickness direction, and a second cladding layer formed on the first cladding layer. The optical module further includes a second groove extending through the first cladding layer and the second cladding layer in the thickness direction, a silicon photonics component mounted on the first cladding layer, and a single-mode fiber fitted into the second groove. The silicon photonics component includes a main body and an optical axis located below the main body. The lower surface of the main body is in contact with the upper surface of the first cladding layer. The optical axis is retained within the first groove. A circumferential surface of the single-mode fiber is in contact with a bottom surface of the second groove and a wall surface of the second groove.

10 Claims, 18 Drawing Sheets

(56) References Cited

U.S. PATENT DOCUMENTS

| | | | | |
|---|---|---|---|---|
| 11,686,906 | B1 * | 6/2023 | Venkatesan .......... | G02B 6/4203 385/93 |
| 2003/0012508 | A1 * | 1/2003 | Westmarland ........... | G02B 6/30 385/137 |
| 2013/0330034 | A1 * | 12/2013 | Feng ...................... | G02B 6/423 438/31 |
| 2022/0268998 | A1 * | 8/2022 | Nakatomi ................ | G02B 6/30 |
| 2025/0012985 | A1 * | 1/2025 | Yanagisawa ......... | G02B 6/4243 |

* cited by examiner

OPTICAL MODULE

CROSS-REFERENCE TO RELATED APPLICATIONS

This application is based upon and claims the benefit of priority from prior Japanese Patent Application No. 2023-112106, filed on Jul. 7, 2023, the entire contents of which are incorporated herein by reference.

FIELD

This disclosure relates to an optical module and a method for manufacturing an optical module.

BACKGROUND

A known optical module used for optical communication includes a silicon photonics component and an optical fiber. Japanese Laid-Open Patent Publication No. 2015-079061 describes an example of an optical module. In the optical module, the optical axis of the silicon photonics component needs to be aligned with the core of the optical fiber with high precision. In particular, when the optical fiber is a single-mode fiber, the core diameter of the single mode fiber is approximately 10 μm. Thus, a tolerance of only a few micrometers is allowed for alignment of the single-mode fiber. This results in the need for high-precision alignment. Active alignment is performed when high precision is required. When performing active alignment, the distribution of light, which is emitted from the silicon photonics component, is monitored to align the single-mode fiber with the silicon photonics component so that intensity of light is maximized.

SUMMARY

Active alignment requires a dedicated device and takes time to perform. Accordingly, there is a need for a technique that facilitates the alignment of a single mode fiber with a silicon photonics component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical module includes a substrate, a first cladding layer formed on the substrate, a first groove that extends through the first cladding layer in a thickness direction, a second cladding layer formed on an upper surface of the first cladding layer, a second groove that extends through the first cladding layer and the second cladding layer in the thickness direction and is in communication with the first groove, a silicon photonics component mounted on the upper surface of the first cladding layer exposed from the second cladding layer, and a single-mode fiber fitted into the second groove. The silicon photonics component includes a main body and an optical axis located at a lower position than a lower surface of the main body. The lower surface of the main body is in contact with the upper surface of the first cladding layer. A side surface of the main body is in contact with a side surface of the second cladding layer. The optical axis is retained within the first groove. A circumferential surface of the single-mode fiber is in contact with a bottom surface of the second groove and a wall surface of the second groove. The optical axis faces a core of the single-mode fiber.

Other features and aspects will be apparent from the following detailed description, the drawings, and the claims.

BRIEF DESCRIPTION OF THE DRAWINGS

The embodiments, together with objects and advantages thereof, may best be understood by reference to the following description of the presently preferred embodiments together with the accompanying drawings.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

One embodiment will now be described with reference to the drawings.

In the accompanying drawings, elements are illustrated for simplicity and clarity and have not necessarily been drawn to scale. To facilitate understanding, hatching lines may be replaced by shadings or may not be illustrated in the cross-sectional views. Each drawing indicates an X-axis, a Y-axis, and a Z-axis, which are orthogonal to each other. In the description hereafter, the direction extending along the X-axis will be referred to as the X-axis direction, the direction extending along the Y-axis will be referred to as the Y-axis direction, and the direction extending along the Z-axis will be referred to as the Z-axis direction. In this specification, "plan view" refers to a view of a subject taken in the Z-axis direction unless otherwise specified. Further, in this specification, "planar shape" refers to a shape of a subject as viewed in the Z-axis direction unless otherwise specified. Also, in this specification, the term "face" is used to indicate that surfaces or members are arranged in front of each other. In this case, the surfaces or members do not have to be entirely in front of each other and may be partially in front of each other. Moreover, in this specification, the term "face" will also be used to describe situations including a case in which two members are separated from each other in addition and a case in which two members are in contact with each other.

Method for Manufacturing Optical Module 20

Figure 1:
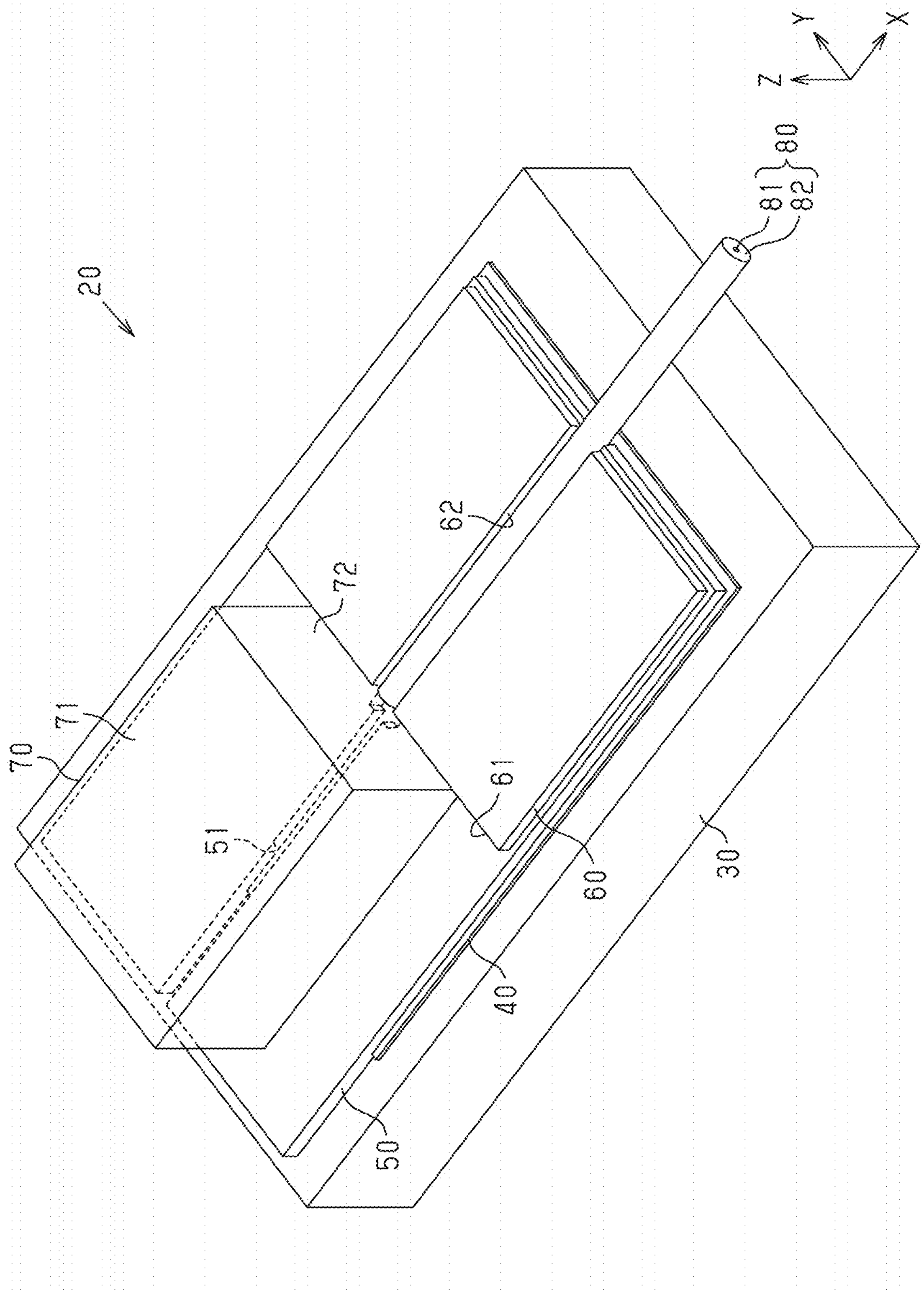
FIG. 1 is a schematic perspective view illustrating one embodiment of an optical module.
Figure 2:
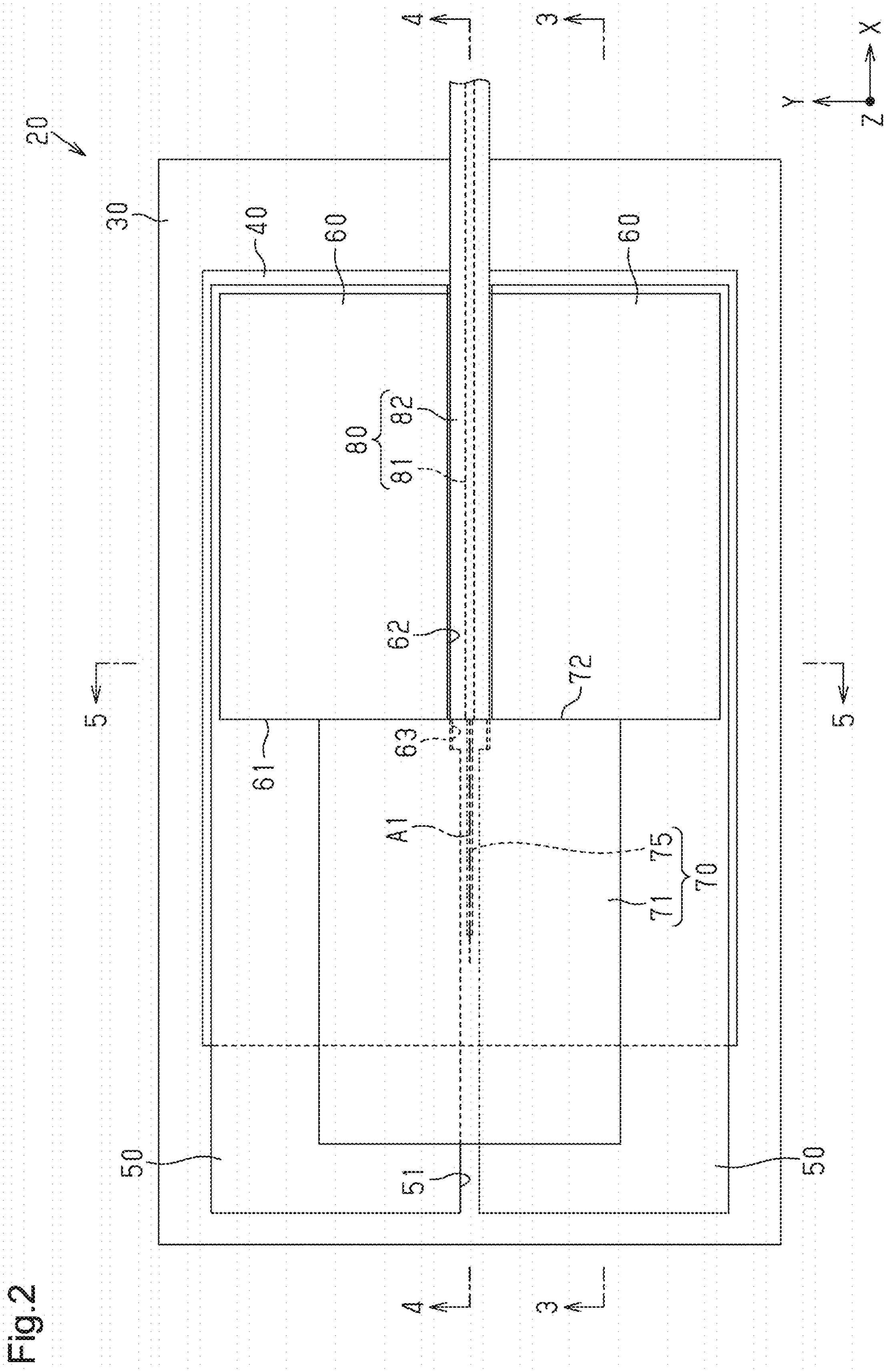
FIG. 2 is a schematic plan view of the optical module illustrated in FIG. 1.

As illustrated in FIGS. 1 and 2, an optical module 20 includes a substrate 30, a metal layer 40, a first cladding layer 50, and a second cladding layer 60. The optical module 20 includes one or more silicon photonics component 70 (one in the present embodiment), mounted on the substrate 30, and one or more single-mode fibers 80 (one in the present embodiment), mounted on the substrate 30.

As illustrated in FIG. 1, the single-mode fiber 80 includes a core 81, which transmits optical signals, and a cladding 82, which surrounds the core 81. The single-mode fiber 80 is cylindrical. The single-mode fiber 80 may have any size. In one example, the single-mode fiber 80 has a diameter (outer diameter) of 125 μm. Further, the single-mode fiber 80 may have any core diameter (i.e., diameter of core 81). For example, the diameter of the core 81 is approximately 10 μm.

Structure of Substrate 30

The substrate 30 has the form of, for example, a flat plate. The substrate 30 is, for example, rectangular in plan view. The silicon photonics component 70 is mounted on the substrate 30. An optical functionality component or electronic component other than the silicon photonics component 70 may be mounted on the substrate 30. Examples of an optical functionality element include a light-emitting element, an optical modulator, an optical amplifier, and an optical attenuator. The substrate 30 is, for example, a wiring substrate including wires electrically connected to electronic components or the like that are set on the substrate 30.

Structure of Metal Layer 40

The metal layer 40 is arranged on the upper surface of the substrate 30. The metal layer 40 is, for example, solidly formed on the upper surface of the substrate 30. As illustrated in FIG. 2, the metal layer 40 is, for example, rectangular in plan view. The material of the metal layer 40 may be, for example, copper or a copper alloy. The metal layer 40 may have a thickness of, for example, about 10 μm to 15 μm.

Structure of First Cladding Layer 50 and Second Cladding Layer 60

Figure 3:
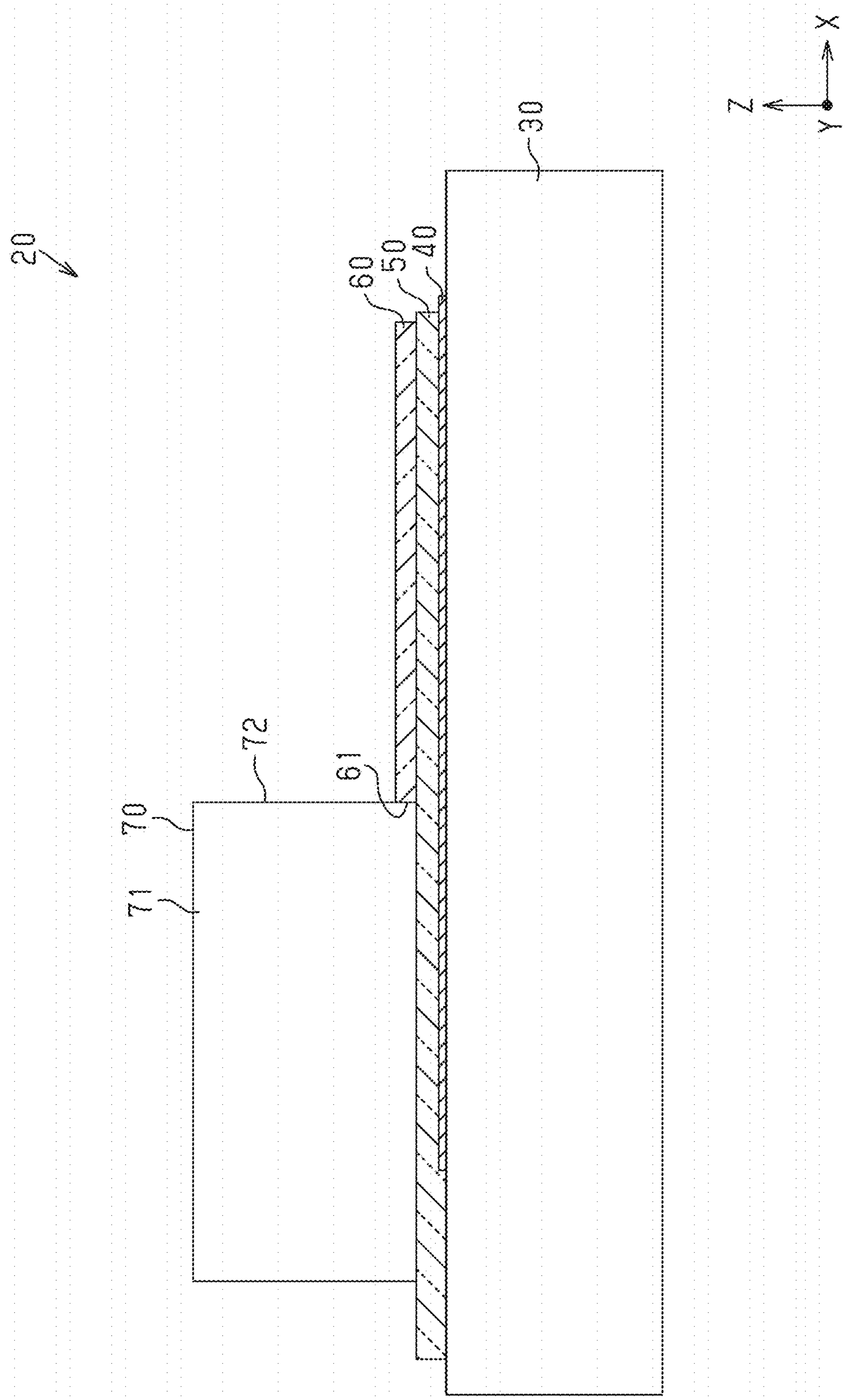
FIG. 3 is a cross-sectional view taken along line 3-3 in FIG. 2.
Figure 4:
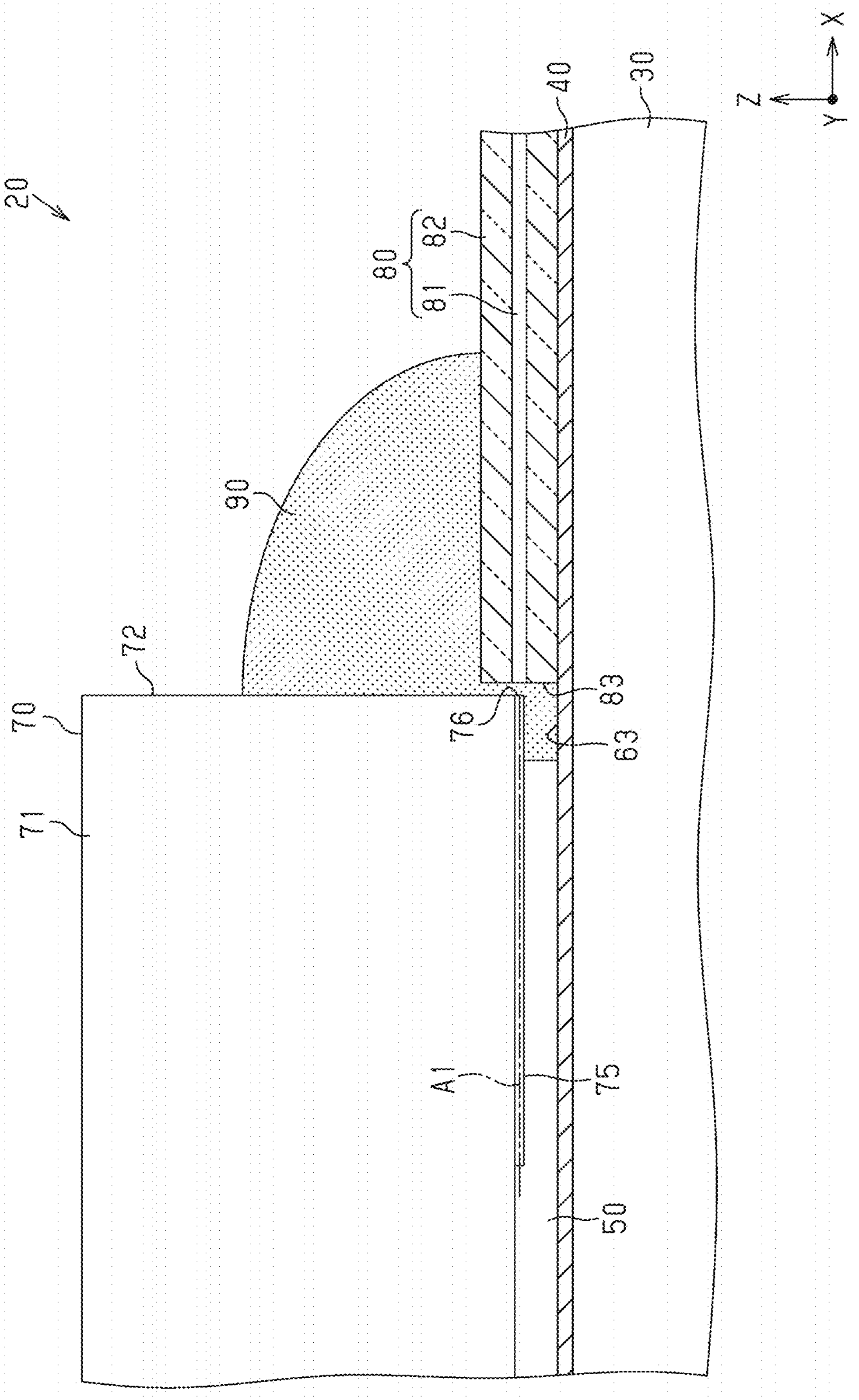
FIG. 4 is a cross-sectional view taken along line 4-4 in FIG. 2.

As illustrated in FIGS. 3 and 4, the first cladding layer 50 is arranged on, for example, the upper surface of the substrate 30. The first cladding layer 50 is arranged on, for example, the upper surface of the metal layer 40. As illustrated in FIG. 3, the first cladding layer 50 is formed on the upper surface of the substrate 30 to partially cover, for example, the upper surface of the metal layer 40. The first cladding layer 50, for example, partially exposes the upper surface of the metal layer 40. The first cladding layer 50 extends in, for example, the X-axis direction.

The second cladding layer 60 is arranged on the upper surface of the first cladding layer 50. The second cladding layer 60 partially covers the upper surface of the first cladding layer 50. For example, the second cladding layer 60 covers one side (right side in FIG. 3) of the first cladding layer 50 in the X-axis direction. The second cladding layer 60 includes a side surface 61 facing the silicon photonics component 70. For example, the side surface 61 is the end surface (left end surface in FIG. 3) of the second cladding layer 60 that faces the silicon photonics component 70 in the X-axis direction.

The material of the first cladding layer 50 and the second cladding layer 60 may be, for example, an epoxy resin or the like. Preferably, the first cladding layer 50 and the second cladding layer 60 are formed from, for example, a resin material that does not contain fillers. The first cladding layer 50 and the second cladding layer 60 may be formed from the same material or from different materials. In the present embodiment, the first cladding layer 50 and the second cladding layer 60 are formed from the same material.

Figure 5:
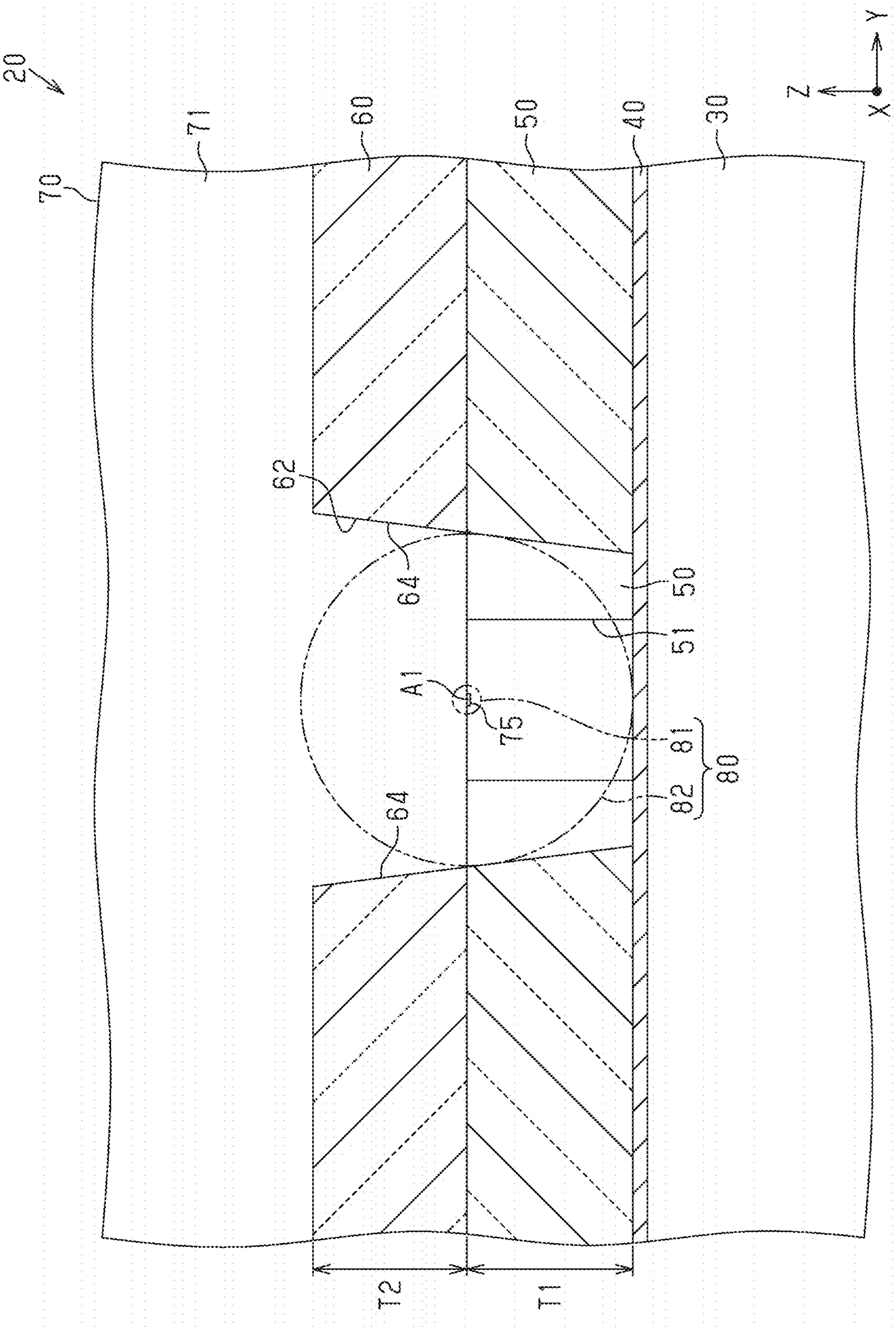
FIG. 5 is a cross-sectional view taken along line 5-5 in FIG. 2.

As illustrated in FIG. 5, the first cladding layer 50 has a thickness T1 from the upper surface of the metal layer 40 to the upper surface of the first cladding layer 50 of about 55 μm to 65 μm. The thickness T1 of the first cladding layer 50 is set, for example, in accordance with the diameter of the single-mode fiber 80. For example, the thickness T1 of the first cladding layer 50 is set in accordance with a projection amount of an optical waveguide 75 of the silicon photonics component 70. In one example, the thickness T1 of the first cladding layer 50 is 62.5 μm. The second cladding layer 60 has a thickness T2 from the upper surface of the first cladding layer 50 to the upper surface of the second cladding layer 60 of about 55 μm to 65 μm. The thickness T2 of the second cladding layer 60 is set, for example, in accordance with the diameter of the single-mode fiber 80. In one example, the thickness T2 of the second cladding layer 60 is 60 μm.

The first cladding layer 50 includes a first groove 51. The first groove 51 extends through the first cladding layer 50 in a thickness direction (Z-axis direction). The first groove 51 exposes the upper surface of the metal layer 40 or the upper surface of the substrate 30. The first groove 51 includes wall surfaces extending, for example, orthogonal to the upper surface of the first cladding layer 50. As illustrated in FIG. 2, the first groove 51 extends, for example, in the X-axis direction. The first groove 51 is arranged in, for example, the central part of the first cladding layer 50 in the Y-axis direction. The first groove 51 is, for example, rectangular and elongated in the X-axis direction in plan view. The first groove 51 may have an opening width in the Y-axis direction of, for example, about 55 μm to 65 μm.

The second cladding layer 60 includes a second groove 62. The second groove 62 extends in, for example, the X-axis direction. The second groove 62 extends over the entire length of the second cladding layer 60 in the X-axis direction. The second groove 62 separates the second cladding layer 60 into two sections. The second groove 62 is located in, for example, the central part of the second cladding layer 60 in the Y-axis direction. The second groove 62 is in communication with the first groove 51. The second groove 62 is in communication with the first groove 51 in the X-axis direction. The second groove 62 extends to, for example, where the first cladding layer 50 is exposed from the second cladding layer 60. That is, the second groove 62 includes an extended groove 63 extending to a single layer portion of only the first cladding layer 50. The extended groove 63 extends outward (leftward in FIG. 2) from the side surface 61 of the second cladding layer 60. The second groove 62 is, for example, rectangular and elongated in the X-axis direction in plan view. The second groove 62 has a given opening width in the Y-axis direction.

As illustrated in FIG. 5, the second groove 62 extends through the second cladding layer 60 and the first cladding layer 50 in the thickness direction. The second groove 62 exposes the upper surface of the metal layer 40. Thus, the upper surface of the metal layer 40 that is exposed from the second groove 62 serves as the bottom surface of the second groove 62. The second groove 62 includes two wall surfaces 64. The two wall surfaces 64 face each other in the width direction of the second groove 62 (i.e., Y-axis direction). Each wall surface 64 is, for example, inclined from the upper surface of the second cladding layer 60 to approach the center of the second groove 62 in the width direction as the metal layer 40 becomes closer. Thus, the second groove 62 is, for example, tapered, that is, narrowed in cross section so that the opening width decreases from the upper surface of the second cladding layer 60 toward the metal layer 40. Each wall surface 64 is, for example, an inclined plane extending straight without any irregularities. Each wall surface 64 is inclined at a constant inclination angle. In this specification, the inclination angle, which is the angle between the wall surface 64 and the upper surface of the metal layer 40, is an acute angle. In one example, the wall surface 64 is inclined at an inclination angle of 83 degrees. Thus, the second groove 62 is tapered to be inclined inward by 7 degrees at each side, which is 14 degrees in total at the two sides.

The opening width of the second groove 62, that is, the opening width of the second groove 62 in the Y-axis direction, is greater than the opening width of the first groove 51, that is, the opening width of the first groove 51 in the Y-axis direction. The opening width at the lower end of the second groove 62 is greater than the opening width of the first groove 51. The opening width at the upper end of the second groove 62 is, for example, greater than the opening width at the lower end of the second groove 62 and greater than the opening width of the first groove 51. The opening width at the upper end of the second groove 62 is, for example, about 140 μm to 150 μm. In one example, the opening width at the upper end of the second groove 62 is 142 μm.

As illustrated in FIG. 2, the extended groove 63 is in communication with the first groove 51. The extended groove 63 extends through the first cladding layer 50 in the thickness direction at a part exposed from the second cladding layer 60. The opening width of the extended groove 63 in the Y-axis direction is greater than the opening width of the first groove 51 in the Y-axis direction. This forms a step at the boundary of the extended groove 63 and the first groove 51.

Structure of Silicon Photonics Component 70

The silicon photonics component 70 is mounted on the upper surface of the first cladding layer 50 exposed from the second cladding layer 60. The silicon photonics component 70 is, for example, adhered to the upper surface of the first cladding layer 50 by an adhesive (not illustrated). The adhesive is, for example, a thermosetting adhesive. The silicon photonics component 70 includes, for example, an optical element such as a light-emitting element or a light-receiving element.

As illustrated in FIG. 4, the silicon photonics component 70 includes a main body 71 and the optical waveguide 75, which projects from the lower surface of the main body 71. The main body 71 has, for example, the form of a parallelepiped. As illustrated in FIG. 2, the main body 71 includes a side surface 72 facing the side surface 61 of the second cladding layer 60. For example, the side surface 72 is the end surface (right end surface in FIG. 2) of the main body 71 that faces the second cladding layer 60 in the X-axis direction.

As illustrated in FIG. 4, the optical waveguide 75 projects downward from the lower surface of the main body 71. The optical waveguide 75 extends in the X-axis direction. The optical waveguide 75 includes an optical axis A1 extending in the X-axis direction. The optical axis A1 is located at a lower position than the lower surface of the main body 71. As illustrated in FIG. 5, the optical axis A1 is, for example, located at the center of the optical waveguide 75 as viewed in the X-axis direction. Although not illustrated in the drawings, the optical waveguide 75 includes, for example, a core, which transmits optical signals, and a cladding, which surrounds the core. The optical axis A1 of the optical waveguide 75 may have any size in a direction orthogonal to the optical axis A1. For example, the size of the optical axis A1 (e.g., core diameter) of the optical waveguide 75 is smaller than the size of the core 81 (e.g., core diameter) of the single-mode fiber 80. For example, the core diameter of the optical axis A1 is 1 μm or less. The projection amount of the optical waveguide 75 from the lower surface of the main body 71 is, for example, about 2 μm to 5 μm.

As illustrated in FIG. 4, the optical waveguide 75 includes an end surface 76 facing the single-mode fiber 80. The end surface 76 is the end surface (right end surface in FIG. 4) of the optical waveguide 75 facing the core 81 of the single-mode fiber 80 in the direction of the optical axis A1, or the optical axis direction. The end surface 76 is, for example, a light emitting surface (light output surface) if the silicon photonics component 70 has a light-emitting capability, and a light-receiving surface if the silicon photonics component 70 does not have a light-emitting capability. The end surface 76 is, for example, flush with the side surface 72 of the main body 71.

As illustrated in FIG. 3, the silicon photonics component 70 is mounted on the upper surface of the first cladding layer 50 with the lower surface of the main body 71 facing the upper surface of the first cladding layer 50, and the side surface 72 of the main body 71 contacting the side surface 61 of the second cladding layer 60. The silicon photonics component 70 is fixed to the upper surface of the first cladding layer 50 by adhering the lower surface of the main body 71 to the upper surface of the first cladding layer 50 with an adhesive (not illustrated). As illustrated in FIG. 2, the silicon photonics component 70 is mounted on the upper surface of the first cladding layer 50 with the optical waveguide 75 retained within the first groove 51 and the extended groove 63. The silicon photonics component 70 is mounted on the upper surface of the first cladding layer 50 so that the optical axis A1 is aligned with the center of the second groove 62 in the Y-axis direction. That is, the optical axis A1 is aligned with the center of the second groove 62 in the Y-axis direction as viewed in the X-axis direction.

The silicon photonics component 70 positions the optical axis A1 in the Z-axis direction when the lower surface of the main body 71 contacts the upper surface of the first cladding layer 50. Further, the silicon photonics component 70 positions the optical axis A1 in the X-axis direction when the side surface 72 of the main body 71 contacts the side surface 61 of the second cladding layer 60.

Structure of Single-Mode Fiber 80

As illustrated in FIG. 1, the single-mode fiber 80 is fitted into the second groove 62. The single-mode fiber 80 is retained within the second groove 62. As illustrated in FIG. 5, the single-mode fiber 80 is mounted on the upper surface of the metal layer 40 that is exposed from the bottom of the second groove 62. The lower side of the circumferential surface of the single-mode fiber 80, as viewed in FIG. 5, is in contact with the upper surface of the metal layer 40. Further, the circumferential surface of the single-mode fiber 80 is in contact with the wall surfaces 64 of the second groove 62. The circumferential surface of the single-mode fiber 80 is in contact with both the wall surfaces 64 of the second groove 62.

The core 81 of the single-mode fiber 80 faces the optical waveguide 75 of the silicon photonics component 70 in the X-axis direction. For example, the single-mode fiber 80 and the silicon photonics component 70 are positioned so that the center of the core 81 is aligned with the center of the optical waveguide 75 (i.e., optical axis A1) as viewed in the X-axis direction. The core 81 is positioned in the Z-axis direction when the single-mode fiber 80 contacts the upper surface of the metal layer 40 that is exposed from the second groove 62. Further, the core 81 is positioned in the Y-axis direction when the single-mode fiber 80 contacts the wall surfaces 64 of the second groove 62. The core 81 of the single-mode fiber 80 is positioned at the center of the second groove 62 in the width direction (Y-axis direction) when the circumferential surface of the single-mode fiber 80 contacts both of the wall surfaces 64 of the second groove 62. The size of the second groove 62 is set to allow the single-mode fiber 80 to be retained therein with the circumferential surface of the single-mode fiber 80 contacting both of the wall surfaces 64. Further, the size of the second groove 62 is set so that the circumferential surface of the single-mode fiber 80 contacts the upper surface of the metal layer 40 and the two wall surfaces 64.

As illustrated in FIG. 4, the single-mode fiber 80 is arranged so that an end surface 83 of the single-mode fiber 80 in the longitudinal direction (i.e., X-axis direction) abuts the side surface 72 of the silicon photonics component 70 and the end surface 76. A gap may form between the single-mode fiber 80 and the silicon photonics component 70.

The single-mode fiber 80 is bonded with the silicon photonics component 70 by an optical adhesive 90. The single-mode fiber 80 is, for example, optically connected (optically coupled) to the optical waveguide 75 of the silicon photonics component 70 by the optical adhesive 90. The optical adhesive 90, for example, fills the gap between the single-mode fiber 80 and the silicon photonics component 70. The optical adhesive 90, which fills the gap between the single-mode fiber 80 and the silicon photonics component 70, prevents air reflection and increases the coupling efficiency of the single-mode fiber 80 and the silicon photonics component 70. The optical adhesive 90, for example, entirely covers the end surface 83 of the single-mode fiber 80. The optical adhesive 90 covers entirely the end surface 76 of the optical waveguide 75. The optical adhesive 90, for example, partially covers the lower surface of the optical waveguide 75. The optical adhesive 90, for example, covers the upper side of the circumferential surface of the single-mode fiber 80, as viewed in FIG. 4. The optical adhesive 90, for example, bulges upward from the circumferential surface of the single-mode fiber 80. The optical adhesive 90, for example, partially covers the side surface 72 of the main body 71 of the silicon photonics component 70. The optical adhesive 90 may be, for example, of an ultraviolet curable type. The optical adhesive 90 has a refractive index that is close to the refractive indices of the core of the optical waveguide 75 and the core 81 of the single-mode fiber 80. The optical adhesive 90 may enter the extended groove 63. For example, the extended groove 63 may be filled with the optical adhesive 90.

Method for Manufacturing Optical Module 20

A method for manufacturing the optical module 20 will now be described with reference to FIGS. 6 to 18. To simplify illustration, elements that will ultimately become the final elements of the optical module 20 are given the same reference characters as the final elements.

Figure 6:
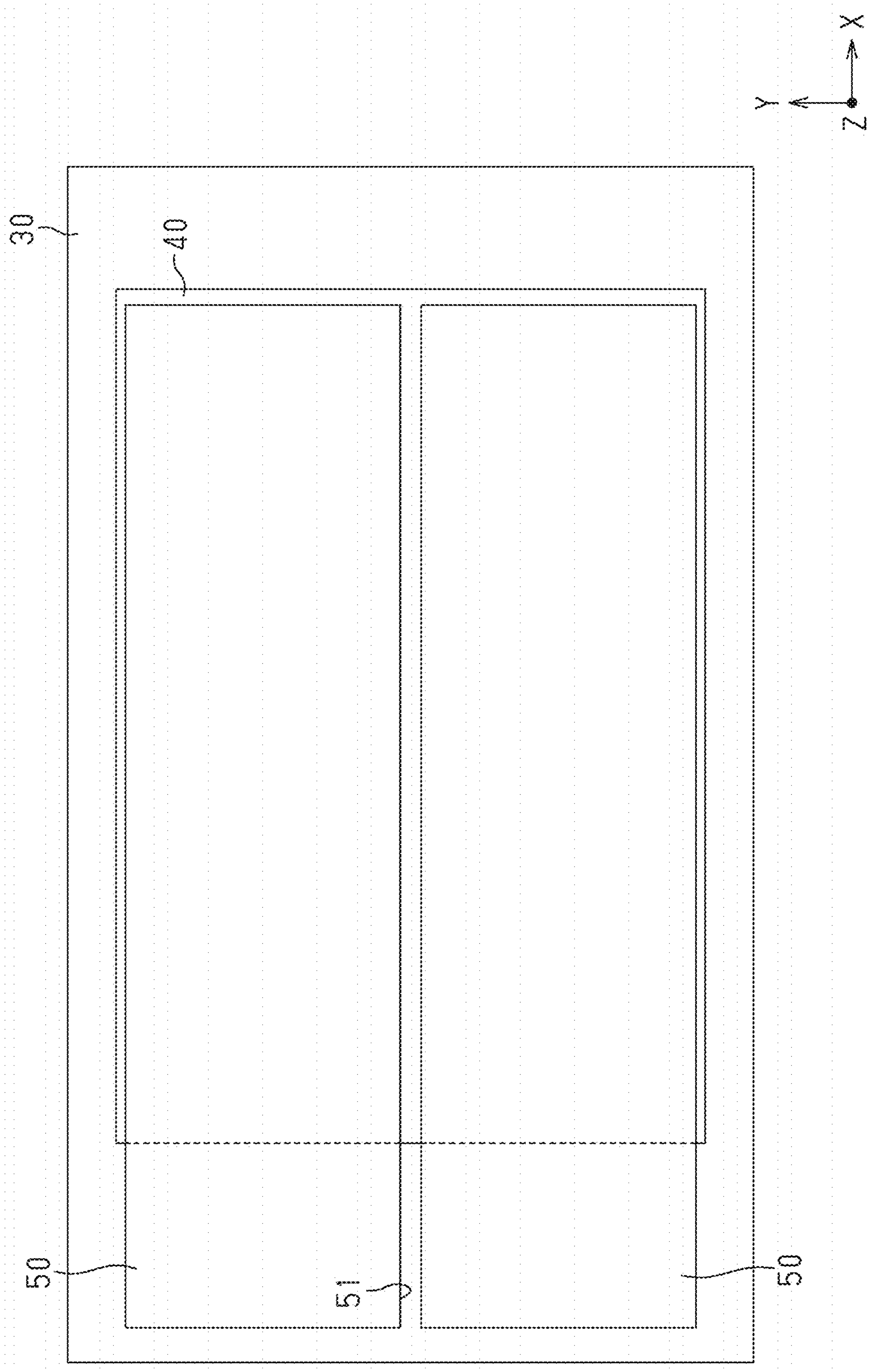
FIG. 6 is a schematic plan view illustrating a manufacturing step of the optical module of FIG. 1.

First, in the step of FIG. 6, the metal layer 40 is formed on the upper surface of the substrate 30. Then, the first cladding layer 50, which covers the metal layer 40, is formed on the upper surface of the substrate 30. The first cladding layer 50 of the present example includes the first groove 51, which extends over the entire length of the first cladding layer 50 in the X-axis direction. For example, a photosensitive resin layer (not illustrated), which becomes the first cladding layer 50, is formed on the entire upper surface of the substrate 30, and a photolithography process is performed to expose and develop the photosensitive resin layer. Then, the photosensitive resin layer is cured. This forms the first cladding layer 50 including the first groove 51. The first groove 51 separates the first cladding layer 50 into two sections in the Y-axis direction. The photosensitive resin layer may be formed by, for example, applying a liquid photosensitive resin to the upper surface of the substrate 30 or laminating a sheet of a semi-cured photosensitive resin to the upper surface of the substrate 30.

Figure 7:
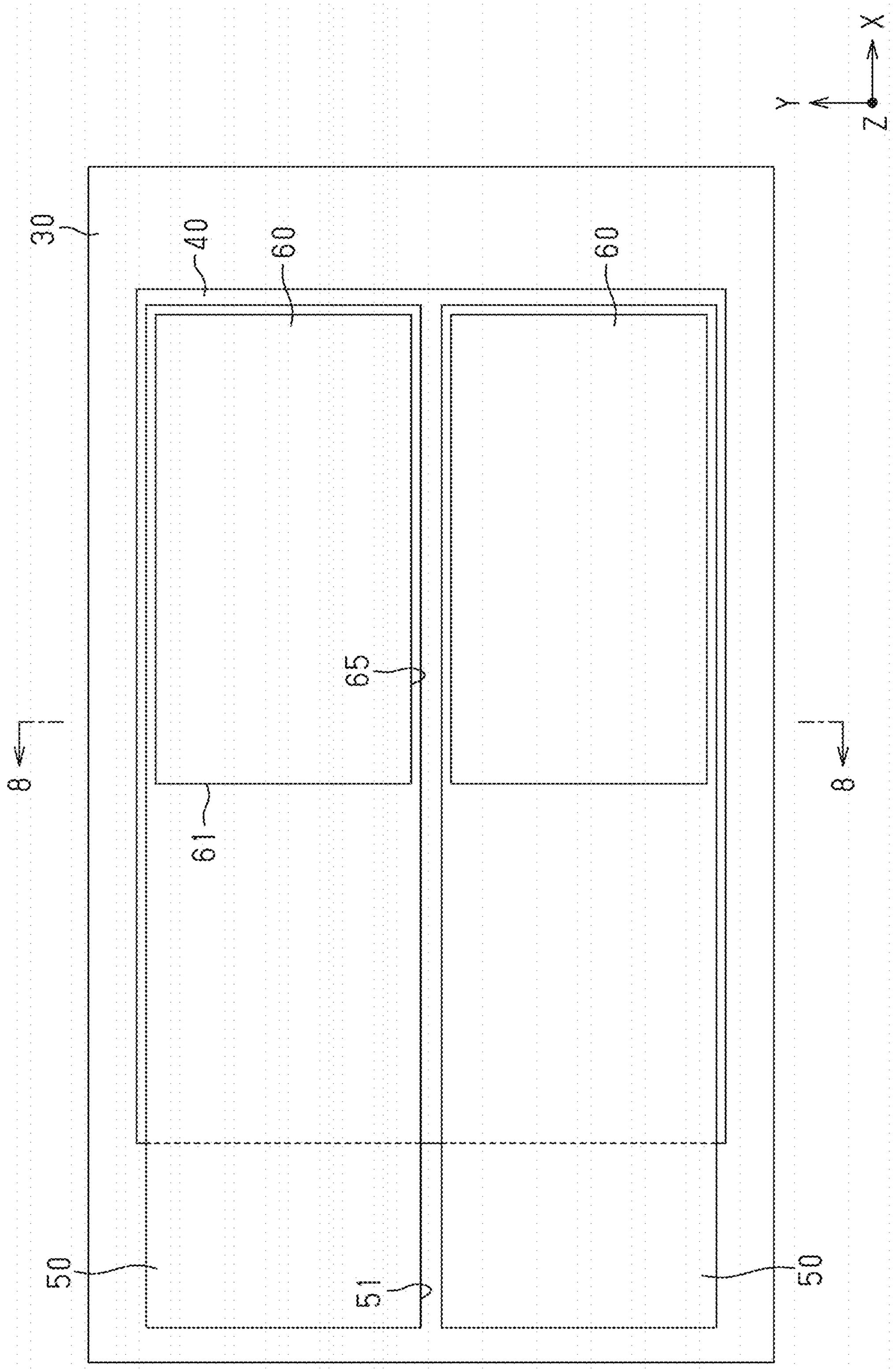
FIG. 7 is a schematic plan view illustrating a manufacturing step of the optical module following the step of FIG. 6.
Figure 8:
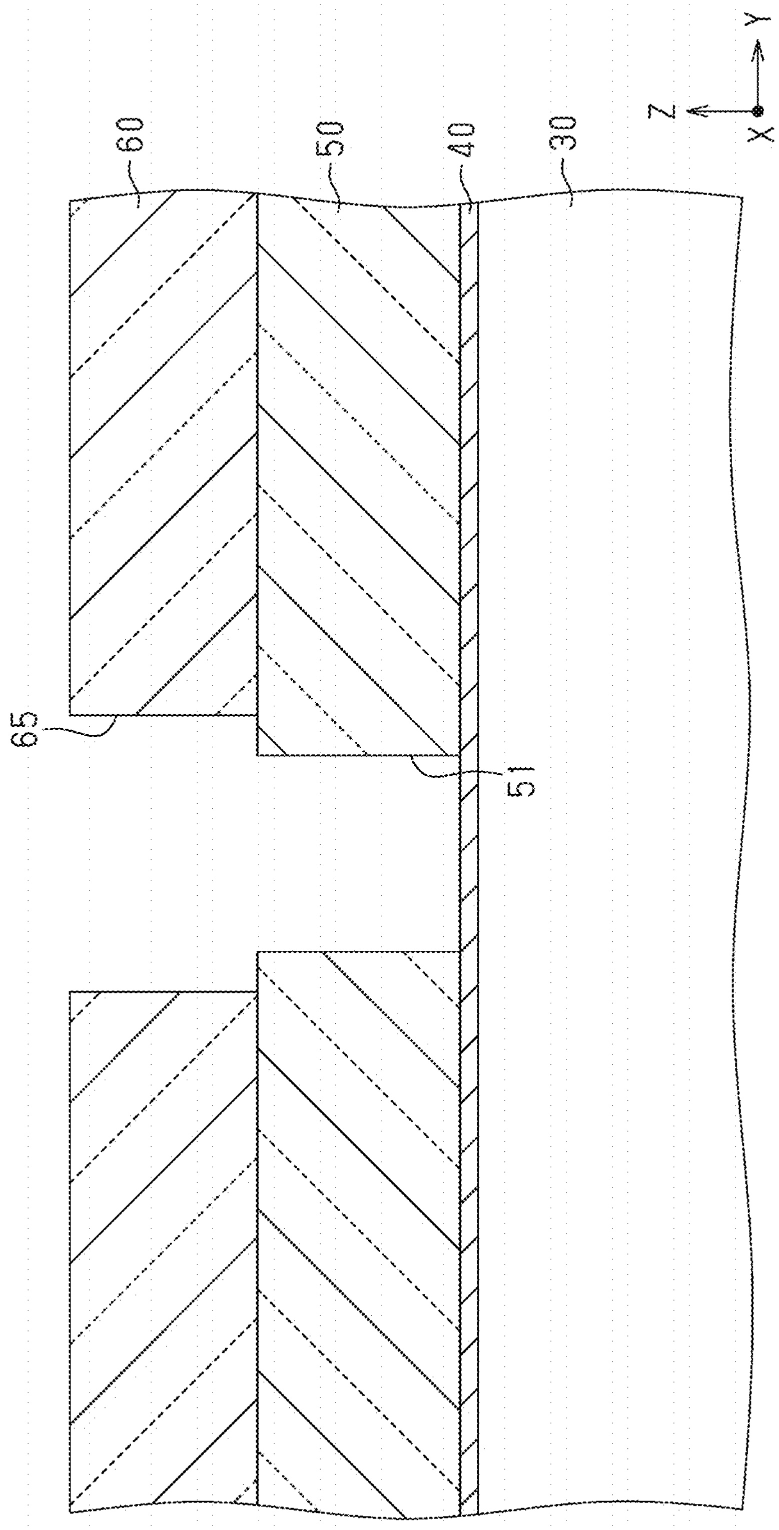
FIG. 8 is a cross-sectional view taken along line 8-8 in FIG. 7.

In the step illustrated in FIGS. 7 and 8, the second cladding layer 60 is formed on the upper surface of the first cladding layer 50. In this example, the second cladding layer 60 is formed on the upper surface of each of the two sections of the first cladding layer 50, which are separated by the first groove 51. For example, a photosensitive resin layer (not illustrated), which becomes the second cladding layer 60, is formed on the entire upper surface of each section of the first cladding layer 50, and a photolithography process is performed to expose and develop the photosensitive resin layer. Then, the photosensitive resin layer is cured. This forms the second cladding layer 60. The second cladding layer 60 includes two sections separated from each other in the Y-axis direction. As illustrated in FIG. 7, each section of the second cladding layer 60 is formed on only part of the upper surface of the corresponding section of the first cladding layer 50 in the X-axis direction. Each section of the second cladding layer 60 overlaps the metal layer 40 in plan view. Each section of the second cladding layer 60 is smaller in dimension in the Y-axis direction than each section of the first cladding layer 50. Thus, as illustrated in FIG. 8, a groove 65 having a larger opening width than the first groove 51 extends between the two sections of the second cladding layer 60. The opening width of the groove 65 in the Y-axis direction is, for example, about 65 μm to 75 μm.

Figure 9:
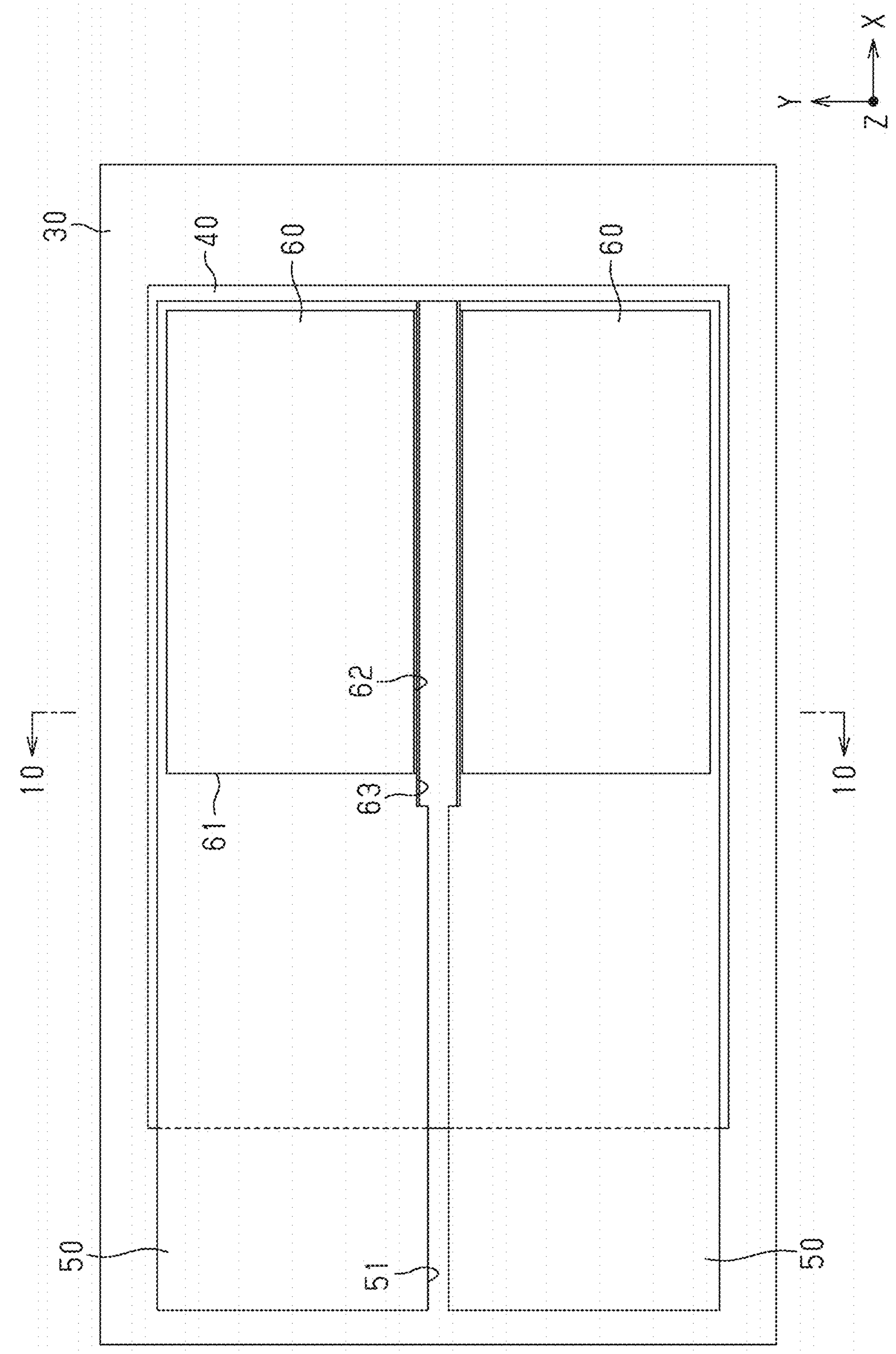
FIG. 9 is a schematic plan view illustrating a manufacturing step of the optical module following the step of FIG. 7.
Figure 10:
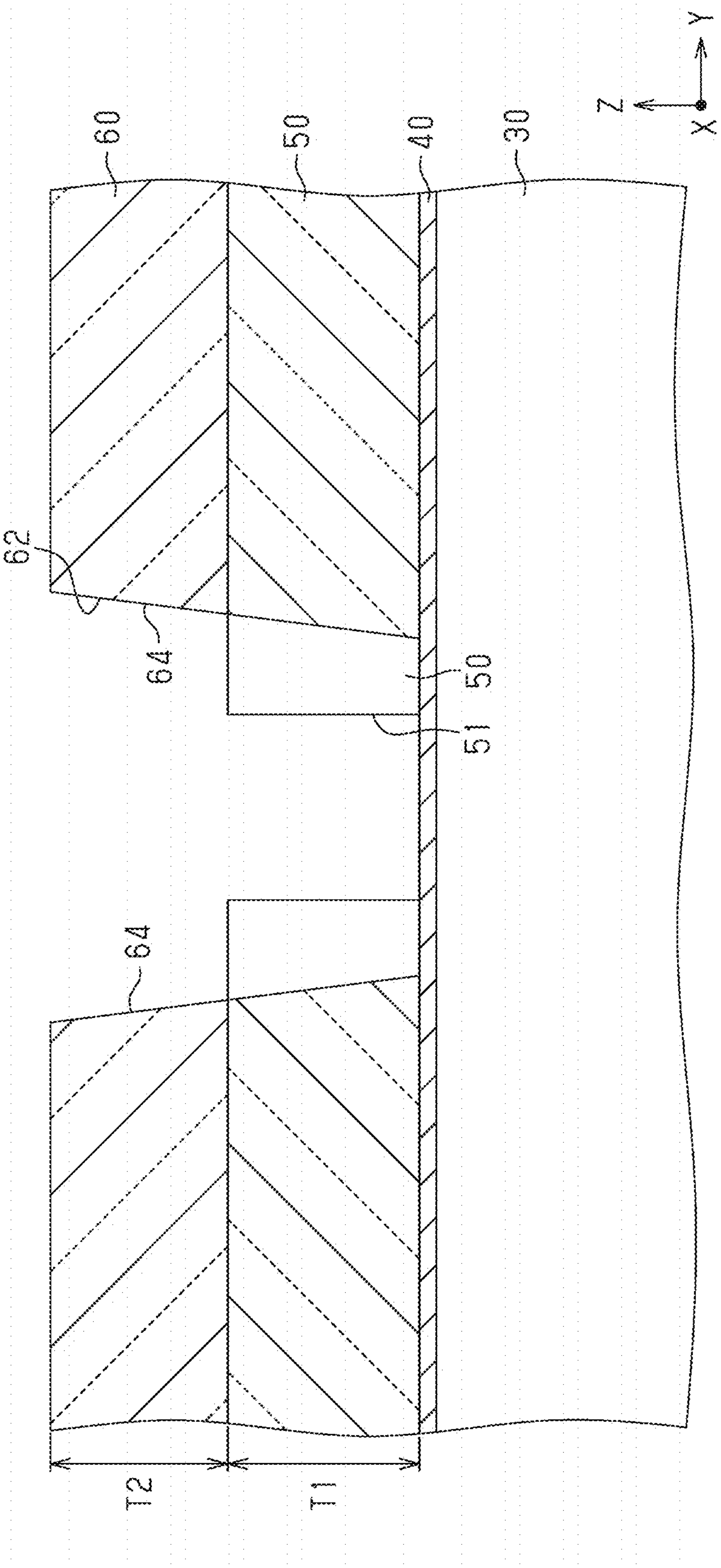
FIG. 10 is a cross-sectional view taken along line 10-10 in FIG. 9.

In the step illustrated in FIGS. 9 and 10, the second groove 62 is formed in the first cladding layer 50 and the second cladding layer 60. As illustrated in FIG. 9, the second groove 62 extends over the entire length of the second cladding layer 60 in the X-axis direction. The second groove 62 includes the extended groove 63 that extends into the first cladding layer 50 exposed from the second cladding layer 60. The second groove 62, which includes the extended groove 63, is formed by, for example, widening the first groove 51 and the groove 65, which are illustrated in FIGS. 7 and 8. The second groove 62 is formed, for example, through laser drilling using an excimer laser and a YAG laser. For example, the use of an excimer laser is preferred when high dimensional accuracy is required for the second groove 62. In the present embodiment, a KrF excimer laser is used to irradiate the first cladding layer 50 and the second cladding layer 60 with light that forms the second groove 62. When using the KrF excimer laser in such a manner, the two wall surfaces 64 will be tapered to be inclined inward by 7 degrees each, that is, 14 degrees in total, as illustrated in FIG. 10. In this step, the metal layer 40 functions as a stopper layer during the laser drilling. Thus, for example, the substrate 30 under the first cladding layer 50 will not be reduced in thickness by excessive laser drilling.

Figure 11:
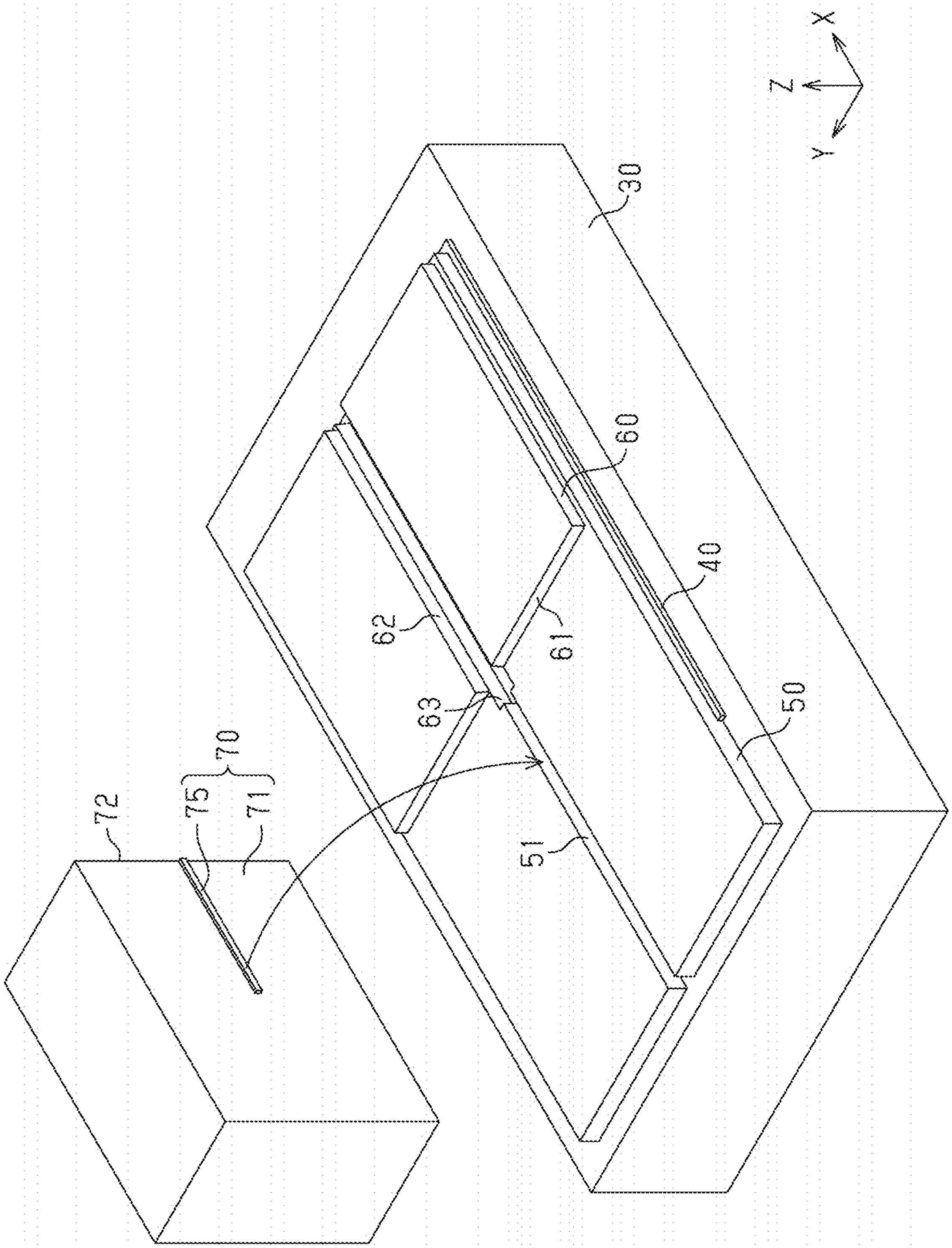
FIG. 11 is a schematic perspective view illustrating a manufacturing step of the optical module following the step of FIG. 9.

In the step of FIG. 11, the silicon photonics component 70, which includes the main body 71 and the optical waveguide 75, is prepared. Then, the silicon photonics component 70 is arranged above the substrate 30 on which the metal layer 40, the first cladding layer 50 including the first groove 51, and the second cladding layer 60 including the second groove 62 are formed.

Figure 12:
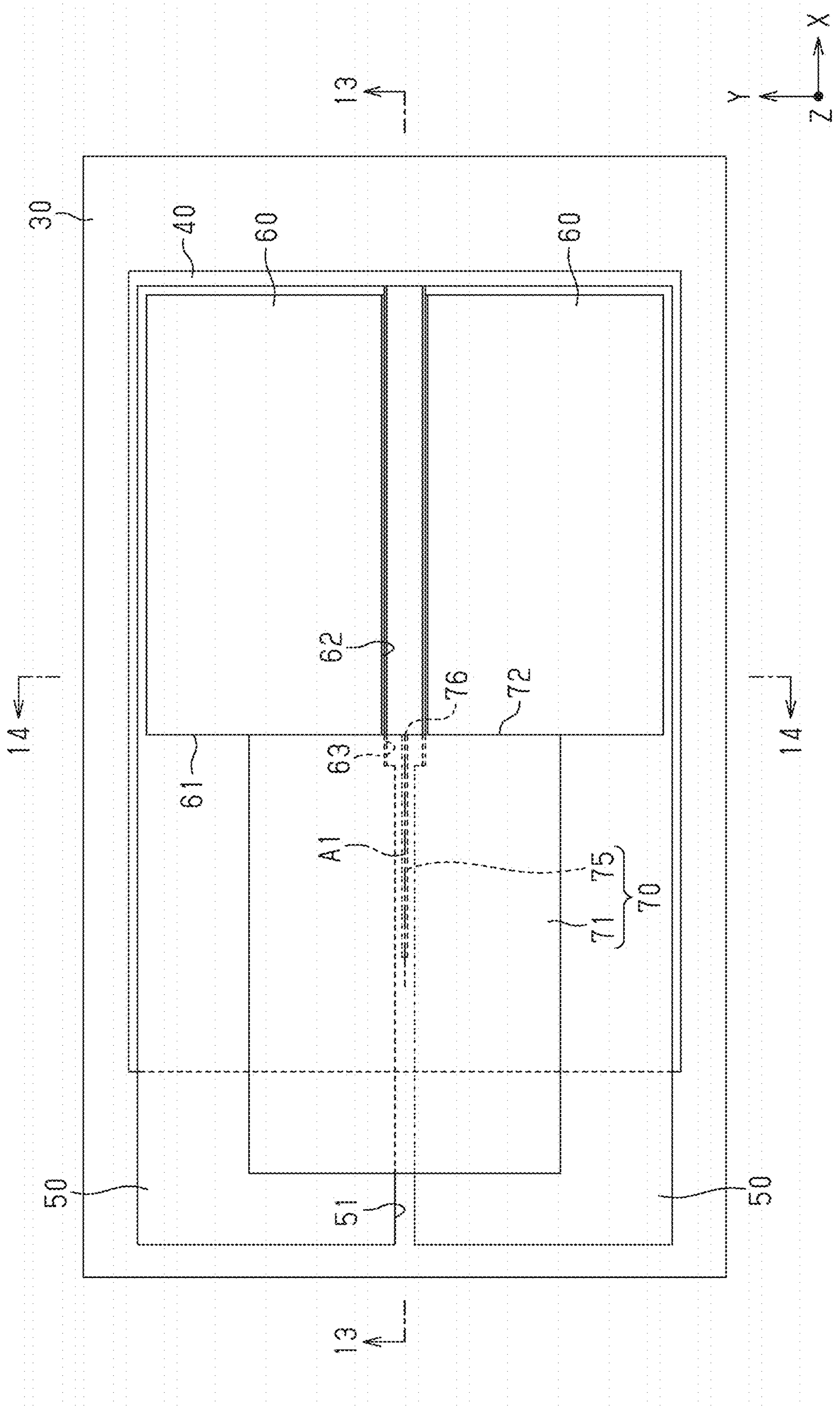
FIG. 12 is a schematic plan view illustrating a manufacturing step of the optical module following the step of FIG. 11.
Figure 13:
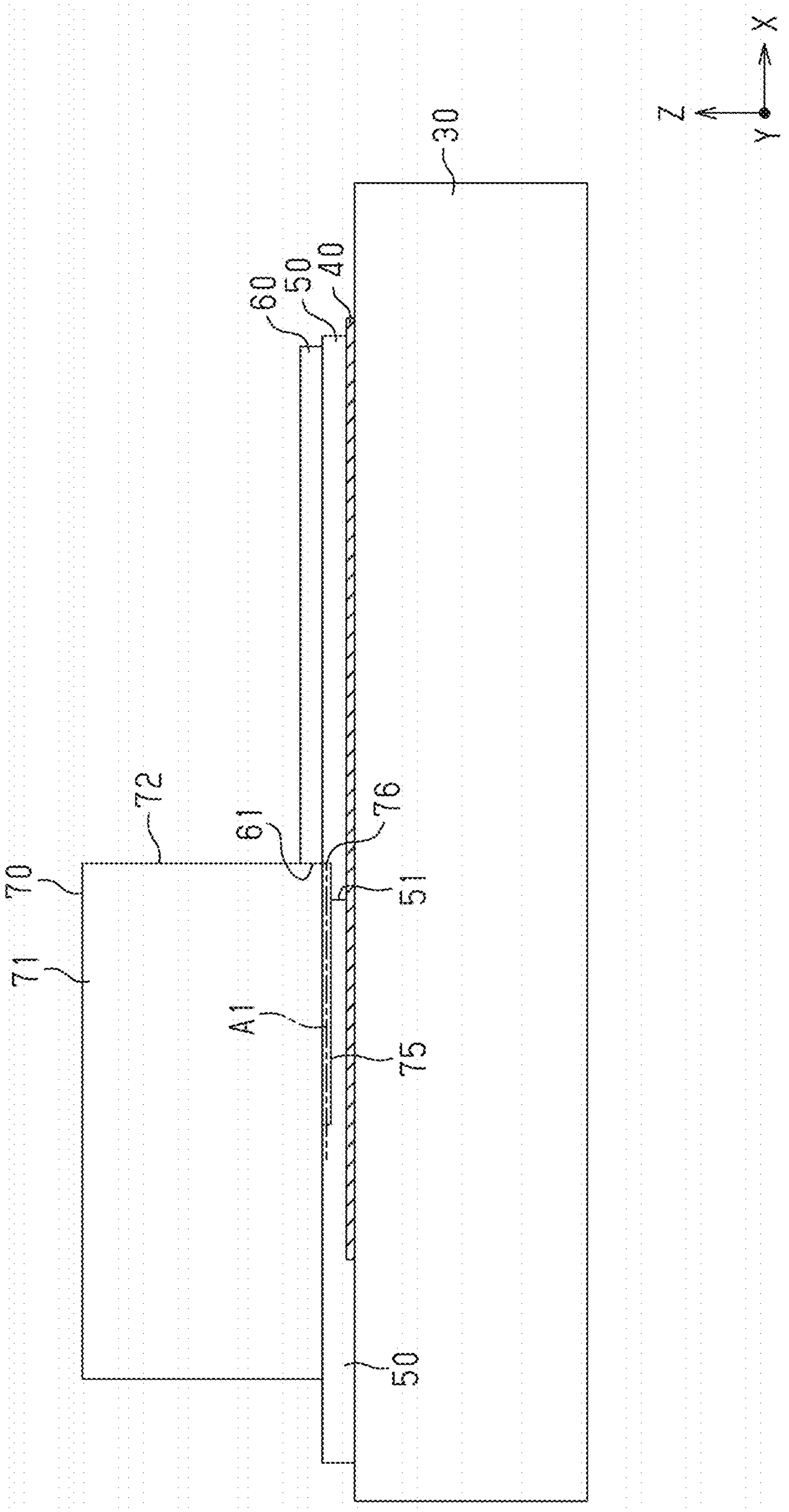
FIG. 13 is a cross-sectional view taken along line 13-13 in FIG. 12.
Figure 14:
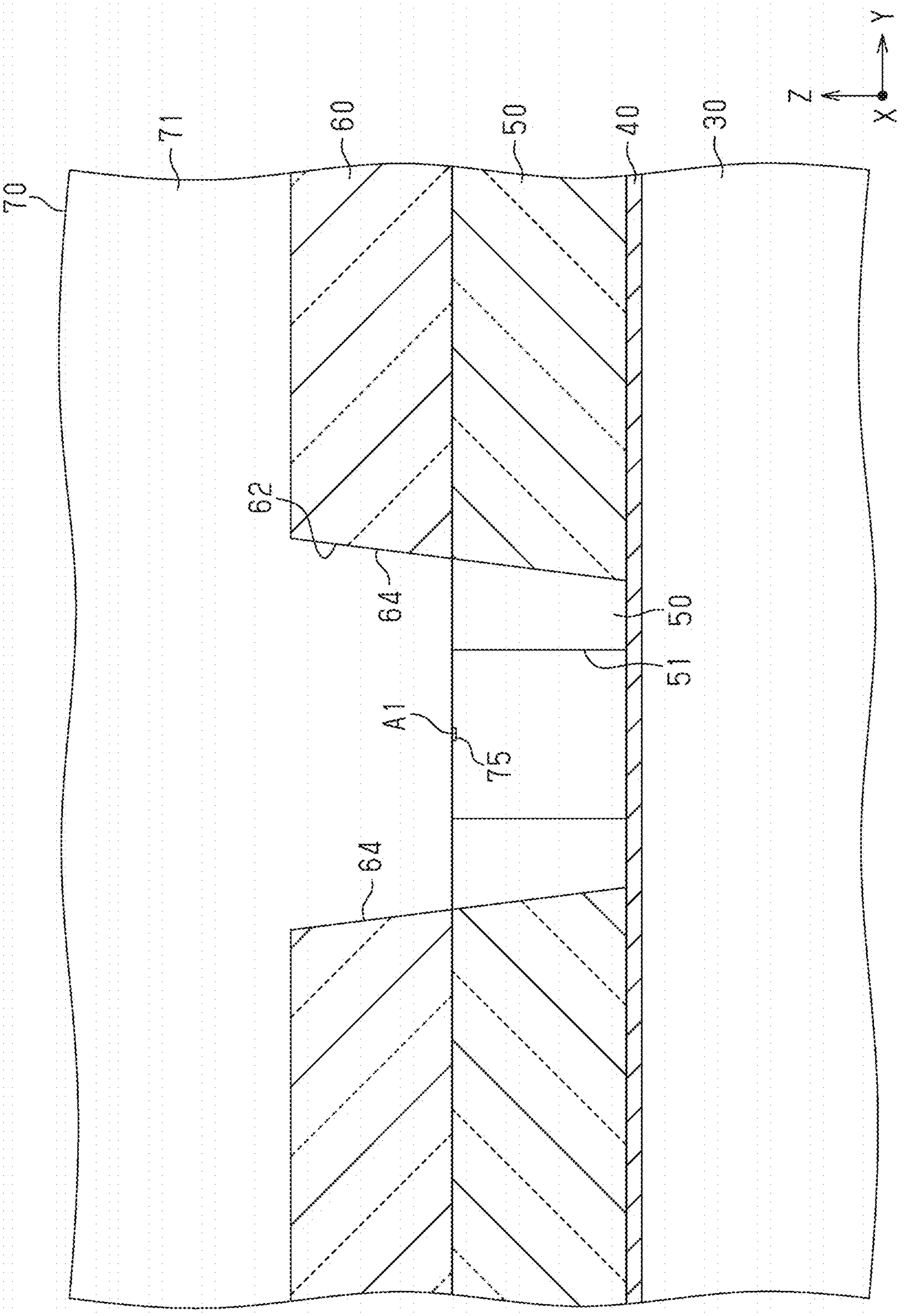
FIG. 14 is a cross-sectional view taken along line 14-14 in FIG. 12.

In the step illustrated in FIGS. 12 to 14, the silicon photonics component 70 is mounted on the upper surface of the first cladding layer 50. As illustrated in FIG. 13, the silicon photonics component 70 is mounted on the upper surface of the first cladding layer 50 with the lower surface of the main body 71 contacting the upper surface of the first cladding layer 50. In this state, a thermosetting adhesive (not illustrated) is applied between the lower surface of the main body 71 and the upper surface of the first cladding layer 50. Further, as illustrated in FIG. 14, the silicon photonics component 70 is mounted on the upper surface of the first cladding layer 50 with the optical waveguide 75, which projects downward from the lower surface of the main body 71, and the optical axis A1 retained within the first groove 51. This accurately positions the optical axis A1 in the height direction of the optical waveguide 75 (i.e., Z-axis direction) when the lower surface of the main body 71 comes into contact with the upper surface of the first cladding layer 50. Further, as illustrated in FIGS. 12 and 13, the silicon photonics component 70 is mounted on the upper surface of the first cladding layer 50 with the side surface 72 of the main body 71 abutting the side surface 61 of the second cladding layer 60. This accurately positions the end surface 76, that is, the optical axis A1 in the optical axis direction of the optical waveguide 75 (i.e., X-axis direction), when the side surface 72 of the main body 71 abuts the side surface 61 of the second cladding layer 60. As illustrated in FIGS. 12 and 14, the silicon photonics component 70 is mounted on the upper surface of the first cladding layer 50 with the optical axis A1 of the optical waveguide 75 aligned with the center of the second groove 62 in the width direction (Y-axis direction). The optical axis A1 in the Y-axis direction may be positioned through, for example, image recognition using an alignment mark or the like.

The steps described above allow the optical axis A1 to be positioned in the X-axis direction, the Y-axis direction, and the Z-axis direction, as illustrated in FIGS. 12 to 14. Then, the structure illustrated in FIGS. 12 to 14 undergoes a heating process to cure the thermosetting adhesive (not illustrated) applied between the lower surface of the main body 71 and the upper surface of the first cladding layer 50. This fixes the silicon photonics component 70 to the upper surface of the first cladding layer 50 with the optical axis A1 of the optical waveguide 75 positioned as designed.

Figure 15:
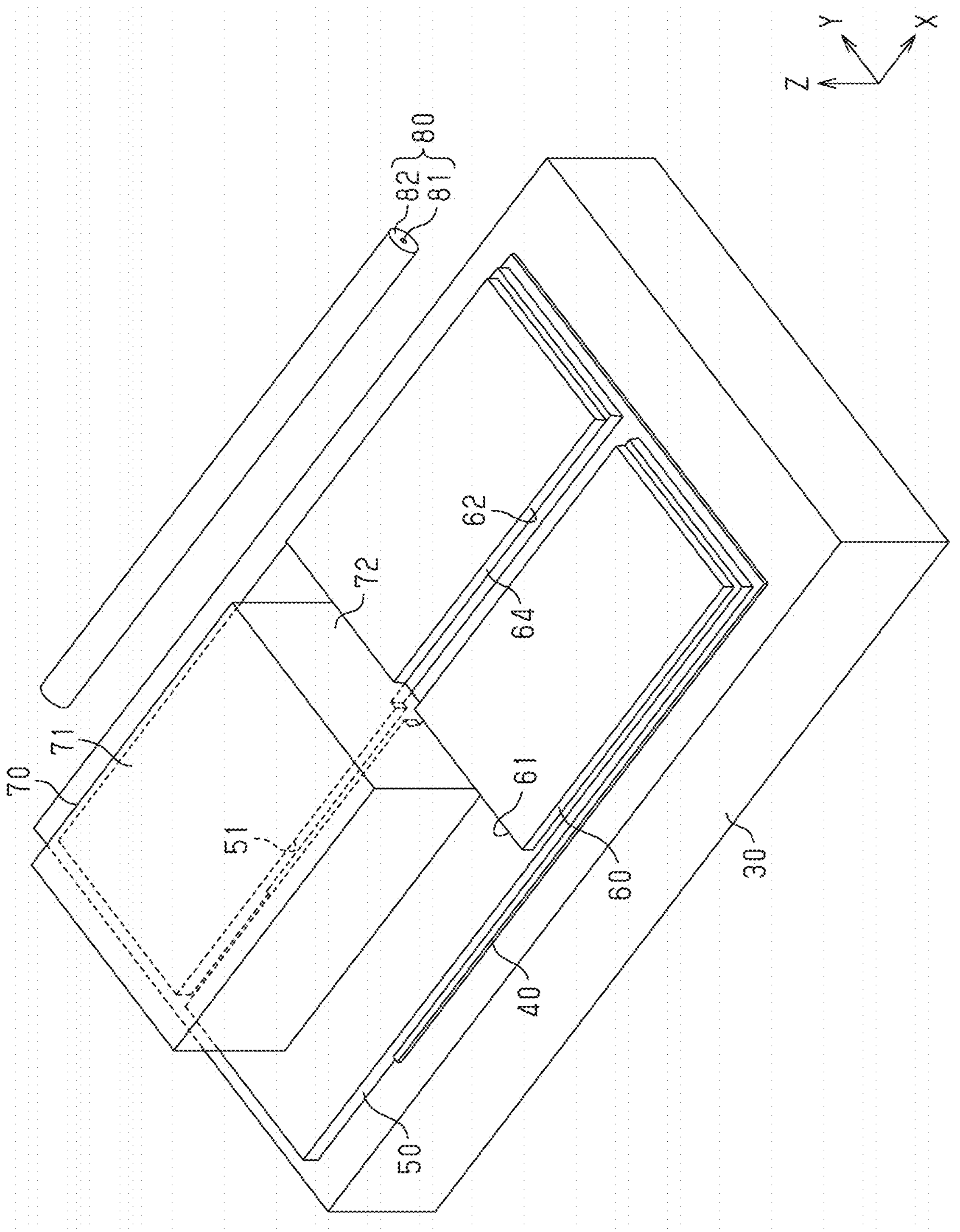
FIG. 15 is a schematic perspective view illustrating a manufacturing step of the optical module following the step of FIG. 12.
Figure 16:
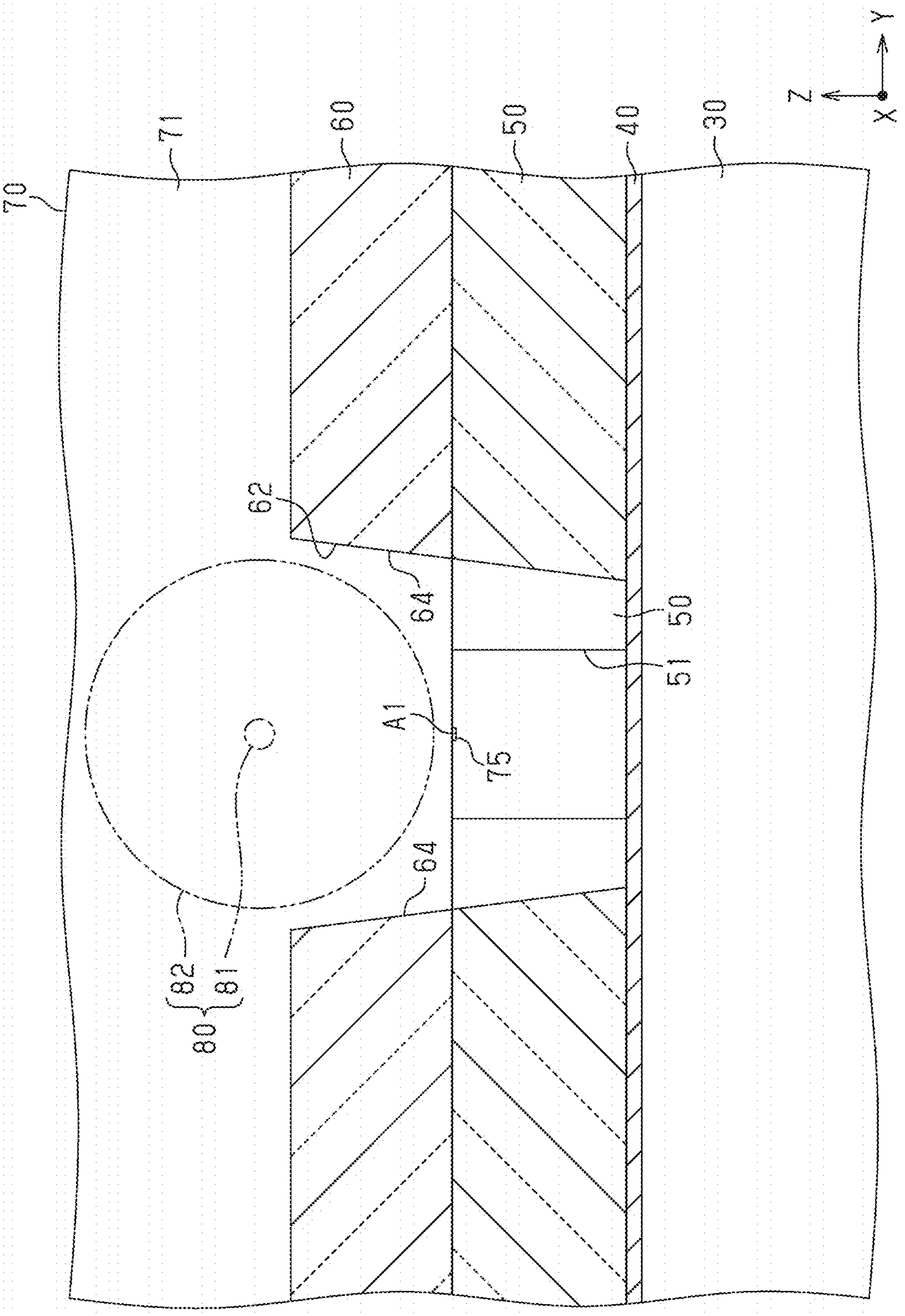
FIGS. 16, 17, and 18 are schematic cross-sectional views illustrating manufacturing steps of the optical module following the step of FIG. 15.

In the step illustrated in FIGS. 15 and 16, the single-mode fiber 80, which includes the core 81 and the cladding 82, is prepared. Then, the single-mode fiber 80 is fitted into the second groove 62 from the upper side of the second cladding layer 60. As illustrated in FIG. 16, each wall surface 64 of the second groove 62 is inclined so that the opening of the second groove 62 widens as the upper surface of the second cladding layer 60 becomes closer. This allows the single-mode fiber 80 to be fitted into the second groove 62 without the circumferential surface of the single-mode fiber 80 sliding while in contact with the wall surfaces 64 of the second groove 62.

Figure 17:
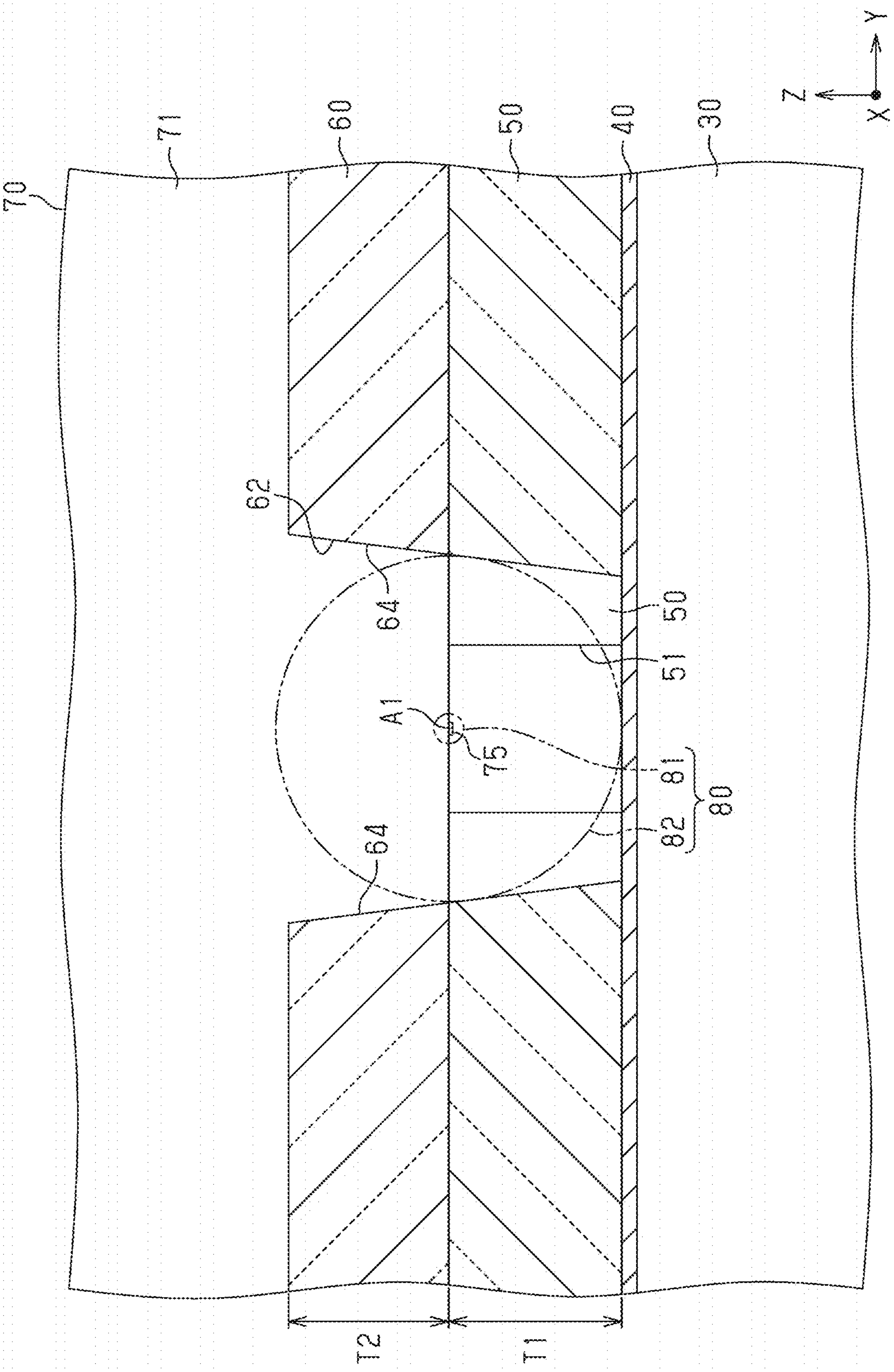

As illustrated in FIG. 17, when the single-mode fiber 80 is fitted into the second groove 62, the single-mode fiber 80 is set on the upper surface of the metal layer 40 exposed from the second groove 62. That is, the lower side of the circumferential surface of the single-mode fiber 80 contacts the upper surface of the metal layer 40. Contact of the circumferential surface of the single-mode fiber 80 with the upper surface of the metal layer 40 accurately positions the core 81 in the depth direction of the second groove 62 (Z-axis direction). The center of the core 81 is positioned so as to be separated from the upper surface of the metal layer 40 in the Z-axis direction by a distance corresponding to the radius of the single-mode fiber 80 (in the present embodiment, 62.5 μm). This aligns the center of the core 81 with the optical axis A1 of the optical waveguide 75 in the Z-axis direction. In other words, the thickness T1 of the first cladding layer 50 is adjusted so that the center of the core 81 is aligned with the optical axis A1 of the optical waveguide 75 in the Z-axis direction when the single-mode fiber 80 is set on the upper surface of the metal layer 40. In the present embodiment, the thickness T1 from the upper surface of the metal layer 40 to the upper surface of the first cladding layer 50 is 62.5 μm.

When the single-mode fiber 80 is fitted into the second groove 62, the wall surfaces 64 of the second groove 62 both contact the circumferential surface of the single-mode fiber 80. Contact between the circumferential surface of the single-mode fiber 80 and the wall surfaces 64 of the second groove 62 allows the core 81 to be accurately positioned in the width direction of the second groove 62 (i.e., Y-axis direction). That is, the center of the core 81 in the Y-axis direction is positioned at the center of the second groove 62 in the width direction. This aligns the center of the core 81 in the Y-axis direction with the optical axis A1 of the optical waveguide 75.

The steps described above allow the center of the core 81 of the single-mode fiber 80 to be aligned with the optical axis A1 of the optical waveguide 75 in both the Y-axis direction and the Z-axis direction. Thus, the center of the core 81 is aligned with the optical axis A1 of the optical waveguide 75 by simply fitting the single-mode fiber 80 into the second groove 62.

Figure 18:
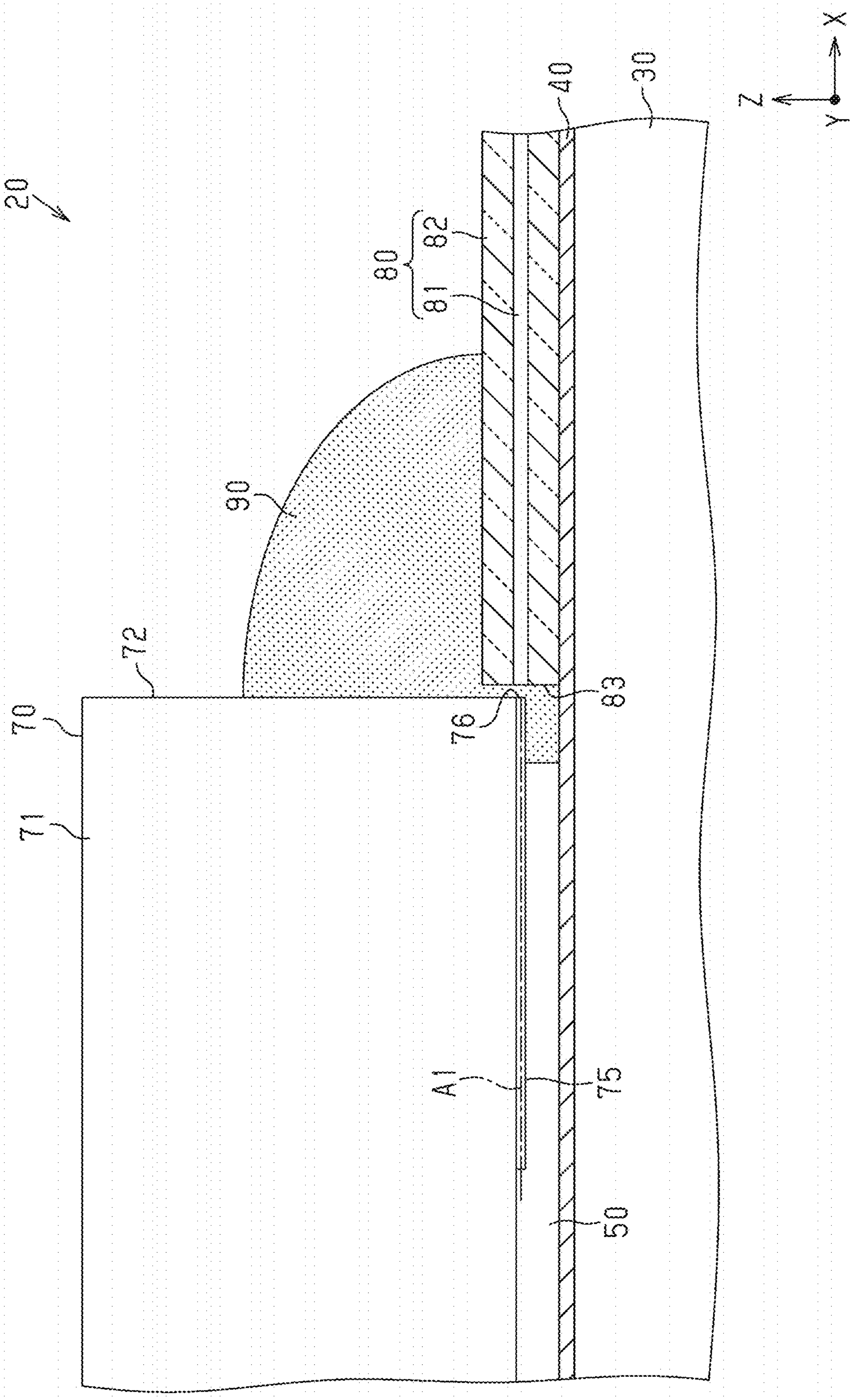

As illustrated in FIG. 18, the single-mode fiber 80 is fitted into the second groove 62 (refer to FIG. 17) so that the end surface 83 in the longitudinal direction (i.e., X-axis direction) of the second groove 62 abuts the side surface 72 of the silicon photonics component 70. Abutment of the end surface 83 and the side surface 72 of the silicon photonics component 70 accurately positions the core 81, particularly, the end surface 83, in the longitudinal direction of the second groove 62. The end surface 83 of the single-mode fiber 80 and the side surface 72 of the silicon photonics component 70 may be spaced apart by a gap.

The steps described above allows the center of the core 81 of the single-mode fiber 80 to be aligned with the optical axis A1 of the silicon photonics component 70 in three directions, which are the X-axis direction, the Y-axis direction, and the Z-axis direction. Thus, the optical axis A1 of the silicon photonics component 70 and the core 81 of the single-mode fiber 80 are aligned with high precision.

In the step of FIG. 18, the optical adhesive 90 bonds the single-mode fiber 80 and the silicon photonics component 70. For example, a dispenser or the like is used to apply the optical adhesive 90, which is uncured, between the single-mode fiber 80 and the silicon photonics component 70. Then, the optical adhesive 90 is irradiated with ultraviolet light and cured so that the optical adhesive 90 bonds the single-mode fiber 80 and the silicon photonics component 70. When there is a gap between the end surface 83 of the single-mode fiber 80 and the side surface 72 of the silicon photonics component 70, the gap is filled with the optical adhesive 90.

The present embodiment has the advantages described below.

(1) The optical module 20 includes the substrate 30, the first cladding layer 50 formed on the substrate 30, the first groove 51 extending through the first cladding layer 50 in the thickness direction, and the second cladding layer 60 formed on the upper surface of the first cladding layer 50. The optical module 20 includes the second groove 62 that extends through the first cladding layer 50 and the second cladding layer 60 in the thickness direction and is in communication with the first groove 51. The optical module 20 includes the silicon photonics component 70, which is mounted on the upper surface of the first cladding layer 50 exposed from the second cladding layer 60, and the single-mode fiber 80, which is fitted to the second groove 62. The silicon photonics component 70 includes the main body 71 and the optical axis A1, which is located at a lower position than the lower surface of the main body 71. The lower surface of the main body 71 is in contact with the upper surface of the first cladding layer 50. The side surface 72 of the main body 71 is in contact with the side surface 61 of the second cladding layer 60. The optical axis A1 is retained within the first groove 51. The circumferential surface of the single-mode fiber 80 is in contact with the bottom surface and the wall surfaces 64 of the second groove 62. The optical axis A1 faces the core 81 of the single-mode fiber 80.

In this structure, the silicon photonics component 70 is mounted on the upper surface of the first cladding layer 50 with the lower surface of the main body 71 contacting the upper surface of the first cladding layer 50. Further, the silicon photonics component 70 is mounted on the upper surface of the first cladding layer 50 with the optical axis A1, which is located at a lower position than the lower surface of the main body 71, retained within the first groove 51. As a result, contact between the lower surface of the main body 71 and the upper surface of the first cladding layer 50 accurately positions the optical axis A1 in the thickness direction of the first cladding layer 50 (in the present embodiment, Z-axis direction). Thus, adjustment of the thickness T1 of the first cladding layer 50 allows the optical axis A1 to be accurately positioned in the Z-axis direction. Further, the single-mode fiber 80 is fitted into the second groove 62 so that the circumferential surface contacts the bottom surface of the second groove 62. Contact between the circumferential surface of the single-mode fiber 80 and the bottom surface of the second groove 62 allows the core 81 to be accurately positioned in the thickness direction of the first cladding layer 50 (in the present embodiment, Z-axis direction). Thus, adjustment of the depth of the second groove 62, that is, the thickness T1 of the first cladding layer 50 and the thickness T2 of the second cladding layer 60, allows the core 81 to be accurately positioned in the Z-axis direction. In this manner, the optical axis A1 and the core 81 may be accurately aligned in the Z-axis direction by adjusting the thickness T1 of the first cladding layer 50 in accordance with the diameter or the like of the single-mode fiber 80 and by fitting the single-mode fiber 80 into the second groove 62. As a result, the optical axis A1 and the core 81 are accurately aligned in the Z-axis direction by simply fitting the single-mode fiber 80 into the second groove 62. This facilitates precision alignment of the silicon photonics component 70 and the single-mode fiber 80.

(2) The silicon photonics component 70 and the single-mode fiber 80 are aligned without driving the silicon photonics component 70. This allows the silicon photonics component 70 and the single-mode fiber 80 to be accurately aligned even under circumstances in which the silicon photonics component 70 cannot be driven.

(3) The second groove 62 is rectangular and elongated in the X-axis direction (first direction) in plan view. The second groove 62 includes the two wall surfaces 64 facing each other in the Y-axis direction (second direction), which is orthogonal to the X-axis direction. The circumferential surface of the single-mode fiber 80 is in contact with both of the wall surfaces 64. The optical axis A1 is aligned with the center of the second groove 62 in the Y-axis direction as viewed in the X-axis direction.

In this structure, the single-mode fiber 80 is fitted into the second groove 62 with the circumferential surface of the single-mode fiber contacting both of the wall surfaces 64, which face each other in the Y-axis direction. Contact of the circumferential surface of the single-mode fiber 80 with the two wall surfaces 64 allows the core 81 to be accurately positioned in the width direction of the second groove 62 (i.e., Y-axis direction). That is, the center of the core 81 in the Y-axis direction is positioned at the center of the second groove 62 in the width direction. As a result, the core 81 is accurately positioned in the Y-axis direction and the Z-axis direction by simply fitting the single-mode fiber 80 into the second groove 62. In this state, image recognition of the like is performed to accurately align the optical axis A1 of the silicon photonics component 70 with the center of the second groove 62 in the width direction. This allows the optical axis A1 and the core 81 to be accurately aligned in the Y-axis direction. When positioning the silicon photonics component 70 through image recognition or the like, the optical axis A1 is positioned in only one direction, namely, the Y-axis direction. Positioning the optical axis A1 in the Y-axis direction is easier than when positioning the optical axis A1 in the two directions of the Y-axis direction and the Z-axis direction through image recognition or the like.

(4) The silicon photonics component 70 is mounted on the upper surface of the first cladding layer 50 with the side surface 72 of the main body 71 abutting the side surface 61 of the second cladding layer 60. This accurately positions the optical axis A1 in the optical axis direction of the optical waveguide 75 (i.e., X-axis direction), or the end surface 76 in the optical axis direction, when the side surface 72 of the main body 71 abuts the side surface 61 of the second cladding layer 60. As a result, the optical axis A1 is accurately positioned in the X-axis direction by simply having the silicon photonics component 70 abut the side surface 61 of the second cladding layer 60.

(5) The single-mode fiber 80 is fitted into the second groove 62 so that the end surface 83 of the single-mode fiber 80 in the longitudinal direction (X-axis direction) abuts the side surface 72 of the silicon photonics component 70. Abutment of the end surface 83 and the side surface 72 of the silicon photonics component 70 accurately positions the core 81, particularly, the end surface 83, in the longitudinal direction of the single-mode fiber 80. As a result, the optical axis A1 and the core 81 are accurately aligned in the X-axis direction by simply having the single-mode fiber 80 abut the silicon photonics component 70.

(6) Each of the two wall surfaces 64 is inclined from the upper surface of the second cladding layer 60 to approach the center of the second groove 62 in the Y-axis direction as the substrate 30 becomes closer. In this structure, the opening of the second groove 62 widens as the upper surface of the second cladding layer 60 becomes closer. Thus, the single-mode fiber 80 may be fitted into the second groove 62 without the circumferential surface of the single-mode fiber 80 sliding while in contact with the wall surfaces 64 of the second groove 62. This avoids wear of the circumferential surface of the single-mode fiber 80 and the wall surfaces 64 of the second groove 62.

(7) The metal layer 40 is formed on the upper surface of the substrate 30. The first cladding layer 50 is formed on the upper surface of the substrate 30 to cover the metal layer 40. The second groove 62 exposes the upper surface of the metal layer 40. This structure allows the metal layer 40 to be used as a stopper layer when forming the second groove 62 through laser drilling. Thus, the substrate 30 under the first cladding layer 50 will not be reduced in thickness by excessive laser drilling. This allows the second groove 62 to be formed with the precise depth. As a result, the positioning accuracy of the core 81 in the Z-axis direction is further improved.

(8) A gap between the silicon photonics component 70 and the single-mode fiber 80 is filled with the optical adhesive 90. Thus, even when there is a gap between the silicon photonics component 70 and the single-mode fiber 80, air reflection at the gap is prevented. This increases the coupling efficiency of the single-mode fiber 80 and the silicon photonics component 70.

Other Embodiments

The above embodiment may be modified as described below. The above embodiment and the modified examples described below may be combined as long as there is no technical contradiction.

In the above embodiment, the structure of the second groove 62 may be changed. For example, the extended groove 63 may be omitted. For example, each wall surface 64 of the second groove 62 may extend orthogonal to the upper surface of the second cladding layer 60.

The first cladding layer 50 may entirely cover the upper surface of the metal layer 40.

The first cladding layer 50 may be formed on only the upper surface of the metal layer 40. That is, the first cladding layer 50 does not have to be formed on the upper surface of the substrate 30 exposed from the metal layer 40.

The first groove 51 may be formed at a different location. For example, the first groove 51 may be decreased in length in the X-axis direction as long as the optical waveguide 75 of the silicon photonics component 70 is retained therein.

The metal layer 40 may be formed at a different location. The metal layer 40 may be decreased in length in the Y-axis direction as long as it overlaps the second groove 62 in plan view.

The metal layer 40 may be omitted.

Clauses

This disclosure further encompasses the following embodiments.

1. A method for manufacturing an optical module, the method including:
   - forming a first cladding layer including a first groove on a substrate;
   - forming a second cladding layer on an upper surface of the first cladding layer;
   - forming a second groove that extends through the first cladding layer and the second cladding layer in a thickness direction and is in communication with the first groove;
   - mounting a silicon photonics component on the upper surface of the first cladding layer exposed from the second cladding layer, the silicon photonics component including a main body and an optical axis located at a lower position than a lower surface of the main body; and
   - fitting a single-mode fiber into the second groove, in which
   - the silicon photonics component is mounted on the upper surface of the first cladding layer with the lower surface of the main body in contact with the upper surface of the first cladding layer, a side surface of the main body in contact with a side surface of the second cladding layer, and the optical axis retained within the first groove, and
   - the single-mode fiber is fitted into the second groove in contact with a bottom surface of the second groove and a wall surface of the second groove.
2. The method according to clause 1, further including:
   - forming a metal layer on an upper surface of the substrate, in which
   - the forming a first cladding layer includes forming the first cladding layer on the upper surface of the substrate to cover the metal layer, and
   - the forming the second groove includes forming the second groove through laser drilling so that the second groove extends through the first cladding layer and the second cladding layer in the thickness direction and exposes an upper surface of the metal layer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An optical module, comprising:

a substrate;

a first cladding layer formed on the substrate;

a first groove that extends through the first cladding layer in a thickness direction;

a second cladding layer formed on an upper surface of the first cladding layer;

a second groove that extends through the first cladding layer and the second cladding layer in the thickness direction and is in communication with the first groove;

a silicon photonics component mounted on the upper surface of the first cladding layer exposed from the second cladding layer; and a single-mode fiber fitted into the second groove, wherein the silicon photonics component includes a main body and an optical axis located at a lower position than a lower surface of the main body, the lower surface of the main body is in contact with the upper surface of the first cladding layer;

a side surface of the main body is in contact with a side surface of the second cladding layer, the optical axis is retained within the first groove, a circumferential surface of the single-mode fiber is in contact with a bottom surface of the second groove and a wall surface of the second groove, and the optical axis faces a core of the single-mode fiber.

2. The optical module according to claim 1, wherein the single-mode fiber is cylindrical, the second groove is rectangular and elongated in a first direction in plan view, the wall surface of the second groove is one of two wall surfaces facing each other in a second direction that is orthogonal to the first direction, the circumferential surface of the single-mode fiber is in contact with both of the two wall surfaces of the second groove, and the optical axis is aligned with a center of the second groove in the second direction as viewed in the first direction.

3. The optical module according to claim 2, wherein each of the two wall surfaces is inclined from an upper surface of the second cladding layer to approach the center of the second groove in the second direction as the substrate becomes closer.

4. The optical module according to claim 2, wherein an opening width of the second groove in the second direction is greater than an opening width of the first groove in the second direction.

5. The optical module according to claim 4, wherein the opening width of the second groove at a lower end of the second groove is greater than the opening width of the first groove.

6. The optical module according to claim 1, further comprising:

a metal layer formed on an upper surface of the substrate, wherein the metal layer overlaps the second cladding layer in plan view, the first cladding layer is formed on the upper surface of the substrate to cover the metal layer, the second groove exposes an upper surface of the metal layer, and the circumferential surface of the single-mode fiber is in contact with the upper surface of the metal layer exposed from the second groove.

7. The optical module according to claim 1, wherein the optical axis is smaller in size than the core in a direction orthogonal to the optical axis.

8. The optical module according to claim 1, further comprising:

an optical adhesive that joins the silicon photonics component and the single-mode fiber, wherein the optical adhesive fills a gap between the silicon photonics component and the single-mode fiber.

9. The optical module according to claim 1, wherein the second groove includes an extended groove that extends to a single layer portion of only the first cladding layer, and the optical axis is retained within the first groove and the extended groove.

10. The optical module according to claim 8, wherein the second groove includes an extended groove that extends to a single layer portion of only the first cladding layer, the optical axis is retained within the first groove and the extended groove, and the optical adhesive enters the extended groove.

* * * * *